United States Patent
Vonderhaar

(10) Patent No.: US 10,471,348 B2
(45) Date of Patent: Nov. 12, 2019

(54) SYSTEM AND METHOD FOR CREATING AND SHARING CUSTOMIZED VIDEO GAME WEAPON CONFIGURATIONS IN MULTIPLAYER VIDEO GAMES VIA ONE OR MORE SOCIAL NETWORKS

(71) Applicant: ACTIVISION PUBLISHING, INC., Santa Monica, CA (US)

(72) Inventor: David J. Vonderhaar, Los Angeles, CA (US)

(73) Assignee: ACTIVISION PUBLISHING, INC., Santa Monica, CA (US)

(*) Notice: Subject to any disclaimer, the term of this patent is extended or adjusted under 35 U.S.C. 154(b) by 107 days.

(21) Appl. No.: 15/140,791

(22) Filed: Apr. 28, 2016

(65) Prior Publication Data

US 2017/0021274 A1    Jan. 26, 2017

Related U.S. Application Data

(60) Provisional application No. 62/196,619, filed on Jul. 24, 2015.

(51) Int. Cl.
| A63F 13/32 | (2014.01) |
| A63F 13/34 | (2014.01) |
| A63F 13/87 | (2014.01) |
| A63F 13/35 | (2014.01) |
| A63F 13/69 | (2014.01) |
| A63F 13/795 | (2014.01) |

(52) U.S. Cl.
CPC ............ *A63F 13/34* (2014.09); *A63F 13/35* (2014.09); *A63F 13/69* (2014.09); *A63F 13/795* (2014.09); *A63F 13/87* (2014.09)

(58) Field of Classification Search
CPC ........ A63F 13/32; A63F 13/34; A63F 13/352; A63F 13/49
See application file for complete search history.

(56) References Cited

U.S. PATENT DOCUMENTS

| 3,860,952 A | 1/1975 | Tallent |
| 3,900,885 A | 8/1975 | Tallent |
| 3,993,982 A | 11/1976 | Tallent |
| 4,018,990 A | 4/1977 | Long |
| 4,372,558 A | 2/1983 | Shimamoto |
| 4,461,301 A | 7/1984 | Ochs |
| 4,540,850 A | 9/1985 | Herr |
| 4,570,930 A | 2/1986 | Matheson |
| 4,572,509 A | 2/1986 | Sitrick |

(Continued)

FOREIGN PATENT DOCUMENTS

| AU | 768367 | 3/2004 |
| AU | 2005215048 | 10/2011 |

(Continued)

OTHER PUBLICATIONS

U.S. Appl. No. 61/049,458, provisional application to Adoni et al. PG pub 201110107239, dated May 1, 2008.

(Continued)

*Primary Examiner* — James S McClellan
(74) *Attorney, Agent, or Firm* — Novel IP

(57) ABSTRACT

A system and method for creating and sharing customized video game weapon configurations in multiplayer video games via one or more social networks is provided.

21 Claims, 9 Drawing Sheets

(56) References Cited

U.S. PATENT DOCUMENTS

| | | |
|---|---|---|
| 4,908,761 A | 3/1990 | Tai |
| 4,958,835 A | 9/1990 | Tashiro |
| 4,972,461 A | 11/1990 | Brown |
| 5,031,089 A | 7/1991 | Liu |
| 5,058,180 A | 10/1991 | Khan |
| 5,273,288 A | 12/1993 | Teshima |
| 5,292,125 A | 3/1994 | Hochstein |
| 5,313,524 A | 5/1994 | Van |
| 5,347,306 A | 9/1994 | Nitta |
| 5,365,360 A | 11/1994 | Torres |
| 5,371,673 A | 12/1994 | Fan |
| 5,432,934 A | 7/1995 | Levin |
| 5,440,624 A | 8/1995 | Schoof |
| 5,442,569 A | 8/1995 | Osano |
| 5,463,616 A | 10/1995 | Kruse |
| 5,493,692 A | 2/1996 | Theimer |
| 5,497,186 A | 3/1996 | Kawasaki |
| 5,502,443 A | 3/1996 | Newberry |
| 5,509,122 A | 4/1996 | Bartow |
| 5,528,745 A | 6/1996 | King |
| 5,530,796 A | 6/1996 | Wang |
| 5,538,255 A | 7/1996 | Barker |
| 5,539,883 A | 7/1996 | Allon |
| 5,558,339 A | 9/1996 | Perlman |
| 5,559,875 A | 9/1996 | Bieselin |
| 5,561,736 A | 10/1996 | Moore |
| 5,563,946 A | 10/1996 | Cooper |
| 5,606,702 A | 2/1997 | Diel |
| 5,627,978 A | 5/1997 | Altom |
| 5,630,129 A | 5/1997 | Wheat |
| 5,634,129 A | 5/1997 | Dickinson |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,710,591 A | 1/1998 | Bruno |
| 5,726,883 A | 3/1998 | Levine |
| 5,736,985 A | 4/1998 | Lection |
| 5,736,990 A | 4/1998 | Barrus |
| 5,737,416 A | 4/1998 | Cooper |
| 5,745,113 A | 4/1998 | Jordan |
| 5,745,678 A | 4/1998 | Herzberg |
| 5,754,776 A | 5/1998 | Hales |
| 5,758,079 A | 5/1998 | Ludwig |
| 5,761,083 A | 6/1998 | Brown |
| 5,762,552 A | 6/1998 | Vuong |
| 5,764,278 A | 6/1998 | Nagao |
| 5,764,916 A | 6/1998 | Busey |
| 5,768,511 A | 6/1998 | Galvin |
| 5,774,668 A | 6/1998 | Choquier |
| 5,793,365 A | 8/1998 | Tang |
| 5,796,393 A | 8/1998 | MacNaughton |
| 5,796,395 A | 8/1998 | De |
| 5,802,282 A | 9/1998 | Hales |
| 5,808,662 A | 9/1998 | Kinney |
| 5,819,084 A | 10/1998 | Shapiro |
| 5,825,877 A | 10/1998 | Dan |
| 5,828,839 A | 10/1998 | Moncreiff |
| 5,828,843 A | 10/1998 | Grimm |
| 5,835,692 A | 11/1998 | Cragun |
| 5,860,137 A | 1/1999 | Raz |
| 5,861,883 A | 1/1999 | Cuomo |
| 5,867,653 A | 2/1999 | Aras |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,890,964 A | 4/1999 | Aoki |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,930,446 A | 7/1999 | Kanda |
| 5,933,818 A | 8/1999 | Kasravi |
| 5,938,722 A | 8/1999 | Johnson |
| 5,938,723 A | 8/1999 | Hales |
| 5,958,014 A | 9/1999 | Cave |
| 5,960,173 A | 9/1999 | Tang |
| 5,969,724 A | 10/1999 | Berry |
| 5,977,979 A | 11/1999 | Clough |
| 5,990,887 A | 11/1999 | Redpath |
| 5,990,888 A | 11/1999 | Blades |
| 6,006,223 A | 12/1999 | Agrawal |
| 6,008,848 A | 12/1999 | Tiwari |
| 6,009,455 A | 12/1999 | Doyle |
| 6,014,145 A | 1/2000 | Bardon |
| 6,018,734 A | 1/2000 | Zhang |
| 6,018,768 A | 1/2000 | Ullman |
| 6,021,268 A | 2/2000 | Johnson |
| 6,021,496 A | 2/2000 | Dutcher |
| 6,025,839 A | 2/2000 | Schell |
| 6,032,129 A | 2/2000 | Greef |
| 6,034,683 A | 3/2000 | Mansour |
| 6,049,798 A | 4/2000 | Bishop |
| 6,049,819 A | 4/2000 | Buckle |
| 6,058,266 A | 5/2000 | Megiddo |
| 6,059,842 A | 5/2000 | Dumarot |
| 6,067,355 A | 5/2000 | Lim |
| 6,069,632 A | 5/2000 | Mullaly |
| 6,070,143 A | 5/2000 | Barney |
| 6,070,149 A | 5/2000 | Tavor |
| 6,072,942 A | 6/2000 | Stockwell |
| 6,076,093 A | 6/2000 | Pickering |
| 6,076,100 A | 6/2000 | Cottrille |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,094,681 A | 7/2000 | Shaffer |
| 6,098,056 A | 8/2000 | Rusnak |
| 6,101,538 A | 8/2000 | Brown |
| 6,104,406 A | 8/2000 | Berry |
| 6,105,055 A | 8/2000 | Pizano |
| 6,111,581 A | 8/2000 | Berry |
| 6,115,718 A | 9/2000 | Huberman |
| 6,122,663 A | 9/2000 | Lin |
| 6,134,588 A | 10/2000 | Guenthner |
| 6,138,128 A | 10/2000 | Perkowitz |
| 6,141,699 A | 10/2000 | Luzzi |
| 6,144,381 A | 11/2000 | Lection |
| 6,147,977 A | 11/2000 | Thro |
| 6,148,294 A | 11/2000 | Beyda |
| 6,148,328 A | 11/2000 | Cuomo |
| 6,151,621 A | 11/2000 | Colyer |
| 6,157,953 A | 12/2000 | Chang |
| 6,163,692 A | 12/2000 | Chakrabarti |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,195,687 B1 | 2/2001 | Greaves |
| 6,199,067 B1 | 3/2001 | Geller |
| 6,201,881 B1 | 3/2001 | Masuda |
| 6,212,494 B1 | 4/2001 | Boguraev |
| 6,212,548 B1 | 4/2001 | Desimone |
| 6,215,877 B1 | 4/2001 | Matsumoto |
| 6,216,098 B1 | 4/2001 | Clancey |
| 6,216,165 B1 | 4/2001 | Woltz |
| 6,219,045 B1 | 4/2001 | Leahy |
| 6,222,551 B1 | 4/2001 | Schneider |
| 6,226,686 B1 | 5/2001 | Rothschild |
| 6,233,583 B1 | 5/2001 | Hoth |
| 6,249,570 B1 | 6/2001 | Glowny |
| 6,249,779 B1 | 6/2001 | Hitt |
| 6,266,649 B1 | 7/2001 | Linden |
| 6,271,842 B1 | 8/2001 | Bardon |

(56) References Cited

U.S. PATENT DOCUMENTS

| | | |
|---|---|---|
| 6,271,843 B1 | 8/2001 | Lection |
| 6,275,820 B1 | 8/2001 | Navin-Chandra |
| 6,282,547 B1 | 8/2001 | Hirsch |
| 6,292,769 B1 | 9/2001 | Flanagan |
| 6,298,129 B1 | 10/2001 | Culver |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,127 B1 | 12/2001 | Bieganski |
| 6,334,141 B1 | 12/2001 | Varma |
| 6,336,134 B1 | 1/2002 | Varma |
| 6,336,137 B1 | 1/2002 | Lee |
| 6,337,700 B1 | 1/2002 | Kinoe |
| 6,345,264 B1 | 2/2002 | Breese |
| 6,345,287 B1 | 2/2002 | Fong |
| 6,349,091 B1 | 2/2002 | Li |
| 6,349,335 B1 | 2/2002 | Jenney |
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,370,560 B1 | 4/2002 | Robertazzi |
| 6,396,513 B1 | 5/2002 | Helfman |
| 6,411,312 B1 | 6/2002 | Sheppard |
| 6,411,947 B1 | 6/2002 | Rice |
| 6,418,424 B1 | 7/2002 | Hoffberg |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,739 B1 | 12/2002 | Cohen |
| 6,501,834 B1 | 12/2002 | Milewski |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,539,421 B1 | 3/2003 | Appelman |
| 6,549,933 B1 | 4/2003 | Barrett |
| 6,553,389 B1 | 4/2003 | Golding |
| 6,556,670 B1 | 4/2003 | Horn |
| 6,559,863 B1 | 5/2003 | Megiddo |
| 6,567,109 B1 | 5/2003 | Todd |
| 6,567,813 B1 | 5/2003 | Zhu |
| 6,574,477 B1 | 6/2003 | Rathunde |
| 6,574,663 B1 | 6/2003 | Bakshi |
| 6,578,054 B1 | 6/2003 | Hopmann |
| 6,580,981 B1 | 6/2003 | Masood |
| 6,584,493 B1 | 6/2003 | Butler |
| 6,594,673 B1 | 7/2003 | Smith |
| 6,601,084 B1 | 7/2003 | Bhaskaran |
| 6,606,657 B1 | 8/2003 | Zilberstein |
| 6,618,751 B1 | 9/2003 | Challenger |
| 6,631,247 B1 | 10/2003 | Motoyama |
| 6,640,230 B1 | 10/2003 | Alexander |
| 6,640,241 B1 | 10/2003 | Ozzie |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,668,173 B2 | 12/2003 | Greene |
| 6,677,968 B1 | 1/2004 | Appelman |
| 6,678,719 B1 | 1/2004 | Stimmel |
| 6,684,255 B1 | 1/2004 | Martin |
| 6,691,162 B1 | 2/2004 | Wick |
| 6,714,967 B1 | 3/2004 | Horvitz |
| 6,717,600 B2 | 4/2004 | Dutta |
| 6,728,754 B1 | 4/2004 | Lipton |
| 6,728,761 B2 | 4/2004 | Decime |
| 6,734,884 B1 | 5/2004 | Berry |
| 6,742,032 B1 | 5/2004 | Castellani |
| 6,754,904 B1 | 6/2004 | Cooper |
| 6,765,596 B2 | 7/2004 | Lection |
| 6,768,790 B1 | 7/2004 | Manduley |
| 6,781,607 B1 | 8/2004 | Benham |
| 6,801,930 B1 | 10/2004 | Dionne |
| 6,807,562 B1 | 10/2004 | Pennock |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,886,050 B2 | 4/2005 | Takamizawa |
| 6,901,379 B1 | 5/2005 | Balter |
| 6,920,478 B2 | 7/2005 | Mendiola |
| 6,938,213 B2 | 8/2005 | Brown |
| 6,941,236 B2 | 9/2005 | Huelsbergen |
| 6,947,738 B2 | 9/2005 | Skog |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,003,286 B2 | 2/2006 | Brown |
| 7,006,616 B1 | 2/2006 | Christofferson |
| 7,028,296 B2 | 4/2006 | Irfan |
| 7,062,533 B2 | 6/2006 | Brown |
| 7,084,754 B2 | 8/2006 | Benejam |
| 7,085,558 B2 | 8/2006 | Berstis |
| 7,089,266 B2 | 8/2006 | Stolte |
| 7,107,316 B2 | 9/2006 | Brown |
| 7,124,071 B2 | 10/2006 | Rich |
| 7,124,164 B1 | 10/2006 | Chemtob |
| 7,130,390 B2 | 10/2006 | Abburi |
| 7,139,792 B1 | 11/2006 | Mishra |
| 7,143,409 B2 | 11/2006 | Herrero |
| 7,159,217 B2 | 1/2007 | Pulsipher |
| 7,171,448 B1 | 1/2007 | Danielsen |
| 7,185,067 B1 | 2/2007 | Viswanath |
| 7,209,137 B2 | 4/2007 | Brokenshire |
| 7,230,616 B2 | 6/2007 | Taubin |
| 7,236,472 B2 | 6/2007 | Lazaridis |
| 7,240,093 B1 | 7/2007 | Danieli |
| 7,249,123 B2 | 7/2007 | Elder |
| 7,263,511 B2 | 8/2007 | Bodin |
| 7,278,108 B2 | 10/2007 | Duarte |
| 7,283,805 B2 | 10/2007 | Agrawal |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,319,957 B2 | 1/2008 | Robinson |
| 7,328,242 B1 | 2/2008 | McCarthy |
| 7,337,353 B2 | 2/2008 | Yamamoto |
| 7,353,295 B1 | 4/2008 | Crow |
| 7,363,355 B2 | 4/2008 | Knauerhase |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |

(56) References Cited

U.S. PATENT DOCUMENTS

| | | |
|---|---|---|
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,617,283 B2 | 11/2009 | Aaron |
| 7,640,587 B2 | 12/2009 | Fox |
| 7,667,701 B2 | 2/2010 | Leah |
| 7,698,656 B2 | 4/2010 | Srivastava |
| 7,702,730 B2 | 4/2010 | Spataro |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,761,339 B2 * | 7/2010 | Alivandi ............ A63F 13/12 705/26.5 |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,844,673 B2 | 11/2010 | Bostick |
| 7,847,799 B2 | 12/2010 | Taubin |
| 7,853,594 B2 | 12/2010 | Elder |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,126,985 B1 | 2/2012 | Kandekar |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |

(56) References Cited

U.S. PATENT DOCUMENTS

| | | | |
|---|---|---|---|
| 8,607,142 B2 | 12/2013 | Bergman | |
| 8,607,356 B2 | 12/2013 | Hamilton, II | |
| 8,624,903 B2 | 1/2014 | Hamilton, II | |
| 8,626,836 B2 | 1/2014 | Dawson | |
| 8,692,835 B2 | 4/2014 | Hamilton, II | |
| 8,706,647 B2 * | 4/2014 | Pathak | G06Q 30/0201 705/319 |
| 8,721,412 B2 | 5/2014 | Chudley | |
| 8,827,816 B2 | 9/2014 | Bhogal | |
| 8,838,640 B2 | 9/2014 | Bates | |
| 8,849,917 B2 | 9/2014 | Dawson | |
| 8,911,296 B2 | 12/2014 | Chudley | |
| 8,992,316 B2 | 3/2015 | Smith | |
| 9,083,654 B2 | 7/2015 | Dawson | |
| 9,152,914 B2 | 10/2015 | Haggar | |
| 9,205,328 B2 | 12/2015 | Bansi | |
| 9,256,654 B2 * | 2/2016 | Spanton | G06F 17/30557 |
| 9,286,731 B2 | 3/2016 | Hamilton, II | |
| 9,299,080 B2 | 3/2016 | Dawson | |
| 9,364,746 B2 | 6/2016 | Chudley | |
| 9,525,746 B2 | 12/2016 | Bates | |
| 9,583,109 B2 | 2/2017 | Kurata | |
| 9,682,324 B2 | 6/2017 | Bansi | |
| 9,764,244 B2 | 9/2017 | Bansi | |
| 9,789,406 B2 | 10/2017 | Marr | |
| 9,808,722 B2 | 11/2017 | Kawachiya | |
| 2001/0032240 A1 | 10/2001 | Malone | |
| 2001/0036835 A1 | 11/2001 | Leedom | |
| 2002/0002514 A1 | 1/2002 | Kamach | |
| 2002/0007319 A1 | 1/2002 | Yu | |
| 2002/0013827 A1 | 1/2002 | Edstrom | |
| 2002/0023230 A1 | 2/2002 | Bolnick | |
| 2002/0026471 A1 | 2/2002 | Bent | |
| 2002/0035480 A1 | 3/2002 | Gordon | |
| 2002/0035593 A1 | 3/2002 | Salim | |
| 2002/0043568 A1 | 4/2002 | Hess | |
| 2002/0065870 A1 | 5/2002 | Baehr-Jones | |
| 2002/0073162 A1 | 6/2002 | McErlean | |
| 2002/0076025 A1 | 6/2002 | Liversidge | |
| 2002/0077080 A1 | 6/2002 | Greene | |
| 2002/0078158 A1 | 6/2002 | Brown | |
| 2002/0086706 A1 | 7/2002 | Chen | |
| 2002/0095586 A1 | 7/2002 | Doyle | |
| 2002/0097856 A1 | 7/2002 | Wullert | |
| 2002/0101848 A1 | 8/2002 | Lee | |
| 2002/0116466 A1 | 8/2002 | Trevithick | |
| 2002/0120719 A1 | 8/2002 | Lee | |
| 2002/0124137 A1 | 9/2002 | Ulrich | |
| 2002/0126135 A1 | 9/2002 | Ball | |
| 2002/0130904 A1 | 9/2002 | Becker | |
| 2002/0131565 A1 | 9/2002 | Scheuring | |
| 2002/0135618 A1 | 9/2002 | Maes | |
| 2002/0136382 A1 | 9/2002 | Cohen | |
| 2002/0169665 A1 | 11/2002 | Hughes | |
| 2002/0172498 A1 | 11/2002 | Esenyan | |
| 2002/0177453 A1 | 11/2002 | Chen | |
| 2002/0184089 A1 | 12/2002 | Tsou | |
| 2002/0184373 A1 | 12/2002 | Maes | |
| 2002/0184391 A1 | 12/2002 | Phillips | |
| 2002/0188589 A1 | 12/2002 | Salmenkaita | |
| 2002/0188688 A1 | 12/2002 | Bice | |
| 2002/0191952 A1 | 12/2002 | Fiore | |
| 2002/0194336 A1 | 12/2002 | Kett | |
| 2002/0198946 A1 | 12/2002 | Wang | |
| 2003/0003938 A1 | 1/2003 | Oneill | |
| 2003/0008712 A1 | 1/2003 | Poulin | |
| 2003/0014297 A1 | 1/2003 | Kaufman | |
| 2003/0023691 A1 | 1/2003 | Knauerhase | |
| 2003/0023854 A1 | 1/2003 | Novak | |
| 2003/0037103 A1 | 2/2003 | Salmi | |
| 2003/0046421 A1 | 3/2003 | Horvitz | |
| 2003/0050977 A1 | 3/2003 | Puthenkulam | |
| 2003/0051036 A1 | 3/2003 | Wang | |
| 2003/0052915 A1 | 3/2003 | Brown | |
| 2003/0055892 A1 | 3/2003 | Huitema | |
| 2003/0055908 A1 | 3/2003 | Brown | |
| 2003/0056002 A1 | 3/2003 | Trethewey | |
| 2003/0061285 A1 | 3/2003 | Usui | |
| 2003/0061622 A1 | 3/2003 | Nebiker | |
| 2003/0076353 A1 | 4/2003 | Blackstock | |
| 2003/0101343 A1 | 5/2003 | Eaton | |
| 2003/0112952 A1 | 6/2003 | Brown | |
| 2003/0126074 A1 | 7/2003 | Klatt | |
| 2003/0135621 A1 | 7/2003 | Romagnoli | |
| 2003/0141977 A1 | 7/2003 | Brown | |
| 2003/0145128 A1 | 7/2003 | Baird | |
| 2003/0177187 A1 | 9/2003 | Levine | |
| 2003/0195957 A1 | 10/2003 | Banginwar | |
| 2003/0210265 A1 | 11/2003 | Haimberg | |
| 2003/0218631 A1 | 11/2003 | Malik | |
| 2004/0014514 A1 | 1/2004 | Yacenda | |
| 2004/0042103 A1 | 3/2004 | Mayer | |
| 2004/0054667 A1 | 3/2004 | Kake | |
| 2004/0059781 A1 | 3/2004 | Yoakum | |
| 2004/0067753 A1 | 4/2004 | Berg | |
| 2004/0078432 A1 | 4/2004 | Manber | |
| 2004/0078596 A1 | 4/2004 | Kent | |
| 2004/0088303 A1 | 5/2004 | Elder | |
| 2004/0103079 A1 | 5/2004 | Tokusho | |
| 2004/0103214 A1 | 5/2004 | Adwankar | |
| 2004/0113756 A1 | 6/2004 | Mollenkopf | |
| 2004/0128181 A1 | 7/2004 | Zurko | |
| 2004/0143852 A1 | 7/2004 | Meyers | |
| 2004/0172339 A1 | 9/2004 | Snelgrove | |
| 2004/0174392 A1 | 9/2004 | Bjoernsen | |
| 2004/0179668 A1 | 9/2004 | Gilbert | |
| 2004/0186886 A1 | 9/2004 | Galli et al. | |
| 2004/0203677 A1 | 10/2004 | Brown | |
| 2004/0205134 A1 | 10/2004 | Digate | |
| 2004/0210627 A1 | 10/2004 | Kroening | |
| 2004/0214609 A1 | 10/2004 | Sagi | |
| 2004/0228291 A1 | 11/2004 | Huslak | |
| 2004/0235509 A1 | 11/2004 | Burritt | |
| 2004/0244006 A1 | 12/2004 | Kaufman | |
| 2004/0254998 A1 | 12/2004 | Horvitz | |
| 2004/0260753 A1 | 12/2004 | Regan | |
| 2004/0260771 A1 | 12/2004 | Gusler et al. | |
| 2004/0267740 A1 | 12/2004 | Liu | |
| 2005/0008000 A1 | 1/2005 | Korycki | |
| 2005/0015571 A1 | 1/2005 | Kaufman | |
| 2005/0021484 A1 | 1/2005 | Bodin | |
| 2005/0027696 A1 | 2/2005 | Swaminathan | |
| 2005/0038797 A1 | 2/2005 | Tabuchi | |
| 2005/0050137 A1 | 3/2005 | Bodin | |
| 2005/0060368 A1 | 3/2005 | Wang | |
| 2005/0071428 A1 | 3/2005 | Khakoo | |
| 2005/0071462 A1 | 3/2005 | Bodin | |
| 2005/0080859 A1 | 4/2005 | Lake | |
| 2005/0081150 A1 | 4/2005 | Beardow | |
| 2005/0091380 A1 | 4/2005 | Gonen | |
| 2005/0097440 A1 | 5/2005 | Lusk | |
| 2005/0132009 A1 | 6/2005 | Solie | |
| 2005/0132056 A1 | 6/2005 | Creamer | |
| 2005/0138108 A1 | 6/2005 | Galvin | |
| 2005/0149327 A1 | 7/2005 | Roth | |
| 2005/0149620 A1 | 7/2005 | Kirkland | |
| 2005/0149876 A1 | 7/2005 | Kortum | |
| 2005/0157174 A1 | 7/2005 | Kitamura | |
| 2005/0165893 A1 | 7/2005 | Feinberg | |
| 2005/0188016 A1 | 8/2005 | Vdaygiri | |
| 2005/0223075 A1 | 10/2005 | Swearingen et al. | |
| 2005/0233736 A1 | 10/2005 | Berstis | |
| 2005/0246711 A1 | 11/2005 | Berstis | |
| 2005/0262204 A1 | 11/2005 | Szeto | |
| 2006/0004659 A1 | 1/2006 | Hutchison | |
| 2006/0026253 A1 | 2/2006 | Kessen | |
| 2006/0031322 A1 | 2/2006 | Kessen | |
| 2006/0031326 A1 | 2/2006 | Ovenden | |
| 2006/0036688 A1 | 2/2006 | McMahan | |
| 2006/0117087 A1 | 6/2006 | Demsky | |
| 2006/0129643 A1 | 6/2006 | Nielson | |
| 2006/0155813 A1 | 7/2006 | Dietz et al. | |
| 2006/0161852 A1 | 7/2006 | Chen | |
| 2006/0178968 A1 | 8/2006 | Jung | |

(56) References Cited

U.S. PATENT DOCUMENTS

| | | | |
|---|---|---|---|
| 2006/0184652 A1* | 8/2006 | Teodosiu | H03M 7/30 709/221 |
| 2006/0190591 A1 | 8/2006 | Bobde | |
| 2007/0111774 A1 | 5/2007 | Okada | |
| 2007/0127669 A1 | 6/2007 | Shields | |
| 2007/0168444 A1 | 7/2007 | Chen | |
| 2007/0168447 A1 | 7/2007 | Chen | |
| 2007/0180040 A1 | 8/2007 | Etgen | |
| 2007/0250622 A1 | 10/2007 | Granito | |
| 2008/0019353 A1 | 1/2008 | Foote | |
| 2008/0046510 A1 | 2/2008 | Beauchamp | |
| 2008/0126350 A1 | 5/2008 | Shoemaker | |
| 2008/0140794 A1 | 6/2008 | Rybak | |
| 2008/0160877 A1 | 7/2008 | Lipman | |
| 2008/0270605 A1 | 10/2008 | Berstis | |
| 2008/0270916 A1 | 10/2008 | Chen | |
| 2008/0301405 A1 | 12/2008 | Kaufman | |
| 2009/0113448 A1 | 4/2009 | Smith | |
| 2009/0265604 A1 | 10/2009 | Howard | |
| 2010/0216553 A1 | 8/2010 | Chudley | |
| 2010/0229108 A1 | 9/2010 | Gerson | |
| 2011/0107239 A1 | 5/2011 | Adoni | |
| 2011/0119151 A1* | 5/2011 | Chopra | G06Q 30/0603 705/26.25 |
| 2013/0237325 A1 | 9/2013 | Chudley | |
| 2014/0344725 A1 | 11/2014 | Bates | |
| 2015/0157928 A1* | 6/2015 | Hall | A61F 13/795 3/795 |
| 2016/0191671 A1 | 6/2016 | Dawson | |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 1209849 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2318701 A | 4/1998 |
| GB | 2339938 | 10/2002 |
| GB | 2352154 | 7/2003 |
| JP | H0879390 A | 3/1996 |
| JP | H10334051 A | 12/1998 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 2001230883 A | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004062539 A | 2/2004 |
| JP | 3575598 | 7/2004 |
| JP | 3579823 B | 7/2004 |
| JP | 3579154 B2 | 10/2004 |
| JP | 0813132 B1 | 1/2005 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213BB | 3/2001 |
| TW | 527825BB | 4/2003 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 9917235 A1 | 4/1999 |
| WO | 0060444 A1 | 10/2000 |
| WO | 0062231 A1 | 10/2000 |
| WO | 0137162 A2 | 5/2001 |
| WO | 0143470 A1 | 6/2001 |
| WO | 0152513 A1 | 7/2001 |
| WO | 0201455 A2 | 1/2002 |
| WO | 0203645 A2 | 1/2002 |
| WO | 02058418 A1 | 7/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Office Action dated May 18, 2017 for U.S. Appl. No. 14/570,054.
Office Action dated Sep. 29, 2016 for U.S. Appl. No. 14/570,054.
Notice of Allowance dated Aug. 12, 2014 for U.S. Appl. No. 13/868,013.
Office Action dated Aug. 16, 2011 for U.S. Appl. No. 12/390,272.
Office Action dated Jan. 31, 2012 for U.S. Appl. No. 12/390,272.
Notice of Allowance dated Dec. 24, 2012 for U.S. Appl. No. 12/390,272.
Glasser et al., AI in Computer Games: From the Player's Goal to AI's Role. University of Nebraska-Lincoln, Computer Science and Engineering, Technical Report TR-UNL-CSE-2004-0004, Issued Mar. 23, 2004. Retrieved from the Internet <URL: http://digitalcommons.unl.edu/cgi/viewcontent.cgi?article=1091&context=csetechreports>.

(56) References Cited

OTHER PUBLICATIONS

Sellers, M., (Artificial) Intelligence in Virtual Worlds. terranova. blogs.com, May 8, 2007. Retrieved from the Internet <URL:http://terranova.blogs.com/terra_nova/2007/05/artificial_inte_html>.
Notice of Allowance dated Jan. 18, 2018 for U.S. Appl. No. 14/570/054; (pp. 1-7).
Corrected Notice of Allowability dated Jan. 26, 2018 for U.S. Appl. No. 14/570,054; (pp. 1-2).
Corrected Notice of Allowance and Fees dated Feb. 9, 2018 for U.S. Appl. No. 14/570,054; (pp. 1-4).
Internet Relay Chat Protocol, May 1993, J. Oikarinen, D. Reed.
Kautz, H., B. Selman, M. Shah.. "Referral Web: Combining Social Networks and Collaborative Filtering". Communications of the ACM, vol. 40, No. 3, Mar. 1997.
Schwartz, M. F., D. C. M. Wood. "Discovering shared interests among people using graph analysis of global electronic mail traffic". Department of Computer Science, University of Colorado, Boulder Co. Oct. 1992.
Wellman, B. "For a social network analysis of computer networks: a sociological perspective on collaborative work and virtual community". Proceedings of the 1996 conference on ACM SIGCPR/SIGMIS. 1-11.
Qureshi, S. "Supporting electronic group processes: a social perspective". Proceedings of the 1995 ACM SIGCPR Conference on Supporting teams, groups, and learning inside the IS function. ACM Press. 24-34.
Ackerman, M.S., B. Starr. "Social activity indicators: interface components for CSCW systems". Proceedings of the 8th ACM Symposium on User Interface and Software Technology. ACM Press. 159-168, Nov. 14-17, 1995.
Garton, L., C. Haythornthwaite, B. Wellman. "Studying on-line social networks in Doing Internet Research", Jun. 1997.
Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.
Wang, Y. "Web Mining and Knowledge Discovery of Usage Patterns". CS748T Project (Part I) Feb. 2000.
Sack, W. "Conversation Map: a content-based Usenet newsgroup browser". Proceedings of the 2000 International Conference on Intelligent User Interfaces. ACM Press. 233-240.
Feldman, R. "Mining unstructured data". Tutorial notes for ACK SIGKDD 1999. ACM Press. 182-236.
Supplementary European Search from the European Patent Office for EP05723458.5, dated Jul. 19, 2010.
International Search Report as Published as WO2005/079538 in corresponding international application No. PCT/US2005/005550, dated Jul. 5, 2006.
Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&amumber-=1266179&isnumber=28322http://ieeexplore.ieee.org/xpl/absprintf.jsp?arnumb- er=1266179.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.

IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Lee et al., "A Self-Adjusting Data Distribution Mechanism for Multidimensional Load Balancing in Multiprocessor-Based Database Systems," Information Systems vol. 19, No. 7, pp. 549-567, 1994.
Ma et al., "A Scalable Parallel Cell-Projection Volume Rendering Algorithm for Three-Dimensional Unstructured Data", IEEE 1997, pp. 1-10.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Hassen et al., "A Task-and Data-Parallel Programming Language Based on Shared Objects," ACM Transactions on Programming Languages and Systems, vol. 20, No. 6, Nov. 1998, pp. 1131-1170.
Andert, "A Simulation of Dynamic Task Allocation in a Distributed Computer System," Proceedings of the 1987 Winter Simulation Conference, 1987, pp. 1-9.
Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.
V. Stojanovic, "Virtual boutique-try clothes on-line", 5th International Conference on Telecommunications in Modern Satellite, Cable and Broadcasting Service. Telsiks 2001. Proceedings of Papers (Cat. No. 01EX517), 2001, pt. 2, p. 802-3 vol. 2.
Roaming Virtual World Is a Real Trip; [Final Edition] Leslie Walker. The Washington Post. Washington, D.C.: Mar. 30, 2006.
E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.
Open API Solutions. "OSA/Parlay". 2002 <http://www.openapisolutions.com/brochures/OSAParlayOverview.pdf>.
Kellerer, W., et al., "A Communication Gateway for Infrastructure Independent Wireless Access", IEEE Communications, vol. 40, No. 3, pp. 126-131, (Mar. 2002).
Peter Saint-Andre, XEP-0149: Time Periods, <http://www.xmpp.org/extensions/xep-0149.html> (Jan. 24, 2006).
Chung-Ming Huang et al., Timed Protocol Verification for Estelle-Specified Protocols, Laboratory of Computer Aided Protocol Engineering (LOCAPE), Institute of Information Engineering National Cheng Kung University, Tainan, Taiwan 70101 R.O.C. (Jul. 1995).
Schulzrinne, RFC 4481 on Timed Presence Extensions to the Presence Information Data Format (PIDF) to Indicate Status Information for Past and Future Time Intervals, <http://www1.ietf.org/mail-archive/web/ietf-announce/current/msg02701.-html> (Jul. 2006).
K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.

* cited by examiner

SYSTEM AND METHOD FOR CREATING AND SHARING CUSTOMIZED VIDEO GAME WEAPON CONFIGURATIONS IN MULTIPLAYER VIDEO GAMES VIA ONE OR MORE SOCIAL NETWORKS

CROSS-REFERENCE TO RELATED APPLICATIONS

This application claims priority to U.S. Provisional Patent Application Ser. No. 62/196,619, filed Jul. 24, 2015, the content of which is hereby incorporated by reference herein in its entirety.

FIELD OF THE INVENTION

The invention relates generally to video games, and more particularly to a system and method for creating and sharing customized video game weapon configurations in multi-player video games via one or more social networks.

BACKGROUND OF THE INVENTION

Multiplayer video games, which enable two or more players to play in a cooperative or adversarial relationship during a gameplay session, have exploded in popularity due, in part, to services such as Microsoft's Xbox LIVE® and Sony's PlayStation Network®, which enable gamers all over the world to play with or against one another.

First-person shooter games are one example of a popular genre of multiplayer video games. Typically, in a first-person shooter game, players may customize a weapon for use during gameplay. For example, a player may be presented with options to personalize various weapon attributes to alter a weapon's performance and/or appearance. Prior to commencing a gameplay session, a player may, for instance, select a particular weapon, equip the selected weapon with one or more weapon attachments, and apply a desired finish (e.g., a particular paint job, camouflage, etc.). Oftentimes, a player may select and customize a weapon based on game type, his or her role within the game (e.g., sniper), individual preferences, or other considerations.

In many instances, if a player opts to alter a customized weapon, the weapon in its previous configuration is erased. As such, a player that wishes to use a previously-customized weapon must recreate the customized weapon from scratch. This process can be time consuming and frustrating for gamers.

In some first-person shooter games, players may have personalized or customized player profiles that enable them to customize the appearance of their avatar (or game character), their weapons, perks or special abilities, and the like. For example, in "Call of Duty®," the first-person shooter video game franchise published by Activision Publishing, Inc., players may create a personalized class, also referred to as a "loadout," to be used in a gameplay session. In many such first-person shooter games, however, if a player wishes to utilize a customized weapon in a different profile (or class), the player must again create the customized weapon from scratch.

The requirement to recreate customized weapons at various points of gameplay in a first-person shooter video game may result in a poor or unsatisfying player experience. This may result in a decreased desire to continue playing the video game.

Further, current first-person shooter games do not appear to enable players to make their customized weapons available for use by other game players during a gameplay session, nor do performance statistics for customized weapons appear to be monitored, stored, or shared.

These and other drawbacks exist with customization of weapons in current first-person shooter multiplayer video games.

SUMMARY OF THE INVENTION

The invention addressing these and other drawbacks relates to a system and method for creating and sharing customized video game weapon configurations in multiplayer video games via one or more social networks.

According to an aspect of the invention, a weapon customization engine may enable a video game player to select and customize a weapon to be used in a gameplay session. In various implementations, a player may select and customize a weapon based on game type, his or her role within the game (e.g., sniper), individual preferences, or other considerations. Weapons may be customized prior to commencement of a gameplay session, or at other times.

In one implementation, a player may select a type of weapon to be used in a gameplay session via one or more user interfaces. Non-limiting examples of weapon types may include, without limitation, assault weapons, heavy weapons, sniper rifles, shotguns, submachine guns, pistols, or other weapon types.

A player may further select a weapon from among a chosen weapon type. Each weapon type, for example, may comprise one or more associated weapons.

In one implementation, the various weapon types and associated weapons made available for selection may be system-defined (e.g., defined by the game logic), user-defined (e.g., through one or more user interfaces prior to the commencement of a gameplay session), or a combination thereof. A player's skill level (e.g., beginner, intermediate, advanced), game type, or other factors may additionally be used to determine whether some or all weapon types and associated weapons are made available to the player for selection.

According to an aspect of the invention, once a weapon has been selected, the weapon customization engine may enable a player to customize the selected weapon by selecting one or more weapon attributes via one or more user interfaces. Weapon attributes may comprise weapon performance attributes, weapon appearance attributes, or other attributes.

Examples of weapon performance attributes may comprise various weapon attachments, components, or accessories including, but not limited to, sights and optics, suppressors, grips, extended magazines, trigger types, bullet types, barrels, launchers, etc. that can impact the performance of a weapon.

Weapon appearance attributes may comprise characteristics concerning the finish of (all or a portion of) a weapon including, but not limited to, paint job, camouflages, or other decorative skins for a weapon. Weapon appearance attributes may also comprise cosmetic variants of weapon attachments, components, or accessories such as, for example, those listed above.

In some instances, certain customizations of a weapon may be non-visible (e.g., upgraded bullets) or difficult to see (e.g., a customized grip). As such, to visually depict such customizations, one or more visual effects or indicators may be utilized. For example, a portion of a weapon or weapon attachment, component, or accessory may glow in one or more colors to indicate a customization, or be shown as translucent, or shaded, or with a custom skin applied, or with a particle effect, or some other effect applied. Numerous examples are possible. Additionally or alternatively, a graphical indicator (e.g., a floating icon, text box, or other graphic) may be displayed in close proximity to the weapon (e.g., hover above or below the weapon) during gameplay to convey the customization. Other visual depictions may be implemented.

In various implementations, customizable attributes may differ based on weapon and/or weapon type. Moreover, a player's skill level, game type, or other factors may also be used to determine whether some or all weapon attributes are made available to the player for customization. As a non-limiting example, some weapon attributes may be "unlocked" or otherwise made available for a player after the player has achieved a certain score, level, or other performance benchmark during gameplay. For instance, a player may be required to complete a certain action (e.g., killing two people with a single bullet) a predetermined number of times to unlock weapon performance attributes and/or weapon appearance attributes. Other examples may of course be implemented.

According to one aspect of the invention, a configuration creation engine may create and store a weapon configuration (or weapon profile) based on a weapon and/or weapon attributes selected by a player. In one implementation, a player may be provided an option to create a weapon configuration after selection and/or customization of a weapon. Alternatively, a weapon configuration may be automatically created after a player has selected a weapon and/or weapon attributes. In some implementations, players may create multiple weapon configurations for use during various gameplay sessions.

In one implementation, the configuration creation engine may associate a name with a created weapon configuration for easy identification of the weapon configuration. For example, a name or other identifier may be assigned to or associated with a weapon configuration. A player may also enter a name (e.g., "Frank's Pain Inflictor") or other identifier during or after creation of a weapon configuration. A name or identifier may comprise a predetermined number (e.g., sixteen) of letters, numbers, and/or other characters. Other types of data may be associated with a weapon configuration.

According to an aspect of the invention, each weapon configuration may include a performance profile comprising one or more weapon performance statistics. Examples of weapon performance statistics may include, for example, damage, accuracy, fire rate, range, handling, mobility, reload time, magazine size, and damage multipliers, among others. Each performance statistic may have an associated number (or other value or rating) that falls within a predetermined range. Each weapon or weapon type may have different weapon performance statistics than other weapons or weapon types. As a non-limiting example, when compared to a submachine gun, a sniper rifle may have a higher range proficiency (or rating), but a lower fire rate.

In one implementation, the configuration creation engine may establish a performance profile for a customized weapon configuration. For example, a given weapon may have an initial or template performance profile. One or more of the weapon performance statistics comprising the performance profile may then be adjusted depending on the particular weapon attributes selected by the player. Each weapon attribute may impact one or more of the weapon performance statistics by a predetermined amount in a positive or negative manner, or have a neutral impact. As a non-limiting example, a weapon equipped with a suppressor attachment may have a reduced damage proficiency (or rating) and range proficiency as compared to the same weapon without the suppressor attachment. In an alternative example, an assault rifle used with a full metal jacket may have an increased damage proficiency, but a reduced accuracy proficiency.

Prior to or during a gameplay session, a player may select to use a default (e.g., a stock or template) weapon configuration, a weapon configuration previously created by the player, or a weapon configuration from among various weapon configurations that have been created and shared (or otherwise made available) by other players (as described in greater detail below).

In some implementations, a player may also select a weapon configuration when creating a personalized or customized player profile, or a "class" or "loadout" in the Call of Duty® franchise. To avoid having to re-create a customized weapon configuration from scratch when creating a new player profile (or class), the invention enables a player to select a weapon configuration previously created by the player, or by other players. In some implementations, a created weapon configuration may be provided for selection whenever a player has an any opportunity to select or create a new weapon.

According to an aspect of the invention, a monitoring engine may monitor and store a variety of statistics during a gameplay session. Monitored gameplay statistics may include, for example, player performance statistics when using a weapon configuration, weapon usage statistics, or other gameplay statistics.

Examples of player performance statistics for a given weapon configuration may include number of kills, accuracy, kill-to-death ratio, win-loss ratio, kills per minute, score, or other statistics.

Weapon usage statistics for a given weapon configuration may include number of shots fired, number of games played, time played, weapon progress, and/or other information related to the use or performance of a weapon configuration.

Player performance statistics and/or weapon usage statistics may be uniform across some or all weapon configurations. Alternatively, some weapon configurations may have a unique set of gameplay statistics based on, for example, weapon, weapon type, and/or weapon attributes.

In one implementation, gameplay statistics for a weapon configuration may be monitored and stored based on each use of the weapon configuration by a player. Acquired statistics may be analyzed on a per player basis, or aggregated for two or more players, over any number of gameplay sessions and/or for any given time period. In this manner, various subsets of monitored gameplay statistics for a given weapon configuration can be obtained.

According to an aspect of the invention, for a given weapon configuration, one or more player performance statistics may be added or averaged over a predetermined number of gameplay sessions (or over a predetermined time interval) to generate an overall player performance rating for a player for that weapon configuration. The overall player performance rating for one or more players for a given weapon configuration may be added or averaged to generate a global player performance rating for that weapon configuration.

Likewise, for a given weapon configuration, one or more weapon usage statistics may be added or averaged over a predetermined number of gameplay sessions (or over a predetermined time interval) to generate an overall weapon usage rating for a player for that weapon configuration. The overall weapon usage rating for one or more players for a given weapon configuration may be added or averaged to generate a global weapon usage rating for that weapon configuration.

In one implementation, a global player performance rating for a given weapon configuration and a global weapon usage rating for the same weapon configuration may be added or averaged to generate a single weapon performance rating for the weapon configuration.

In some implementations, players may, via one or more user interfaces, browse or filter various weapon configurations available for selection and use by one or more of individual player performance rating, global player performance rating, individual weapon usage rating, global weapon usage rating, or single weapon performance rating.

According to an aspect of the invention, a sharing engine may enable a player to share weapon configurations, information about weapon configurations, and/or gameplay statistics associated with use of weapon configurations, both internally (e.g., in-game) and externally (e.g., via one or more external social networks).

For example, for a given weapon configuration, a player may specify that he or she wishes to share one or more of weapon type, weapon, weapon performance attributes, weapon appearance attributes, weapon performance statistics, player performance statistics, weapon usage statistics, individual player performance rating, global player performance rating, individual weapon usage rating, global weapon usage rating, single weapon performance rating, or other information relating the weapon configuration. A player may further specify that he or she wishes to make a customized weapon configuration available for gameplay by one or more other players.

In some implementations, a user may specify that a customized weapon configuration and/or some or all of the foregoing information be made available to all players, or a subset of players including, but not limited to, friends (or followers), or team members, or other groups of players.

The sharing engine may enable a player to share weapon configurations, information about weapon configurations, and/or gameplay statistics internally (or in-game) via, for example, an in-game social network or a game publisher-centric social network accessible in-game by game players.

Additionally or alternatively, the sharing engine may enable a player to share weapon configurations, information about weapon configurations, and/or gameplay statistics via one or more external social networks (e.g., Facebook, Google+, Twitter, Instagram, Vine, Tumblr, etc.).

In one implementation of the invention, the sharing engine may enable a player to transmit communications (e.g., email messages, text messages, or other electronic communications) that include hyperlinks or other selectable graphical user interface objects that enable recipients to access the shared information.

In yet another implementation of the invention, the sharing engine may further enable a player to include personalized text, graphics, pictures, audio, video, or other multimedia when sharing weapon configurations, information about weapon configurations, and/or gameplay statistics.

According to an aspect of the invention, the sharing engine may further enable a player to issue challenges to one or more other video game players to obtain or exceed certain player performance statistics, weapon usage statistics, or ratings, and/or achieve other objectives using a given weapon configuration. Challenges may have predetermined durations such that a challenge issuer may require a challenge recipient to attempt or complete a challenge within a predetermined number of gameplay sessions, or within a predetermined time interval.

In one implementation, players may follow the progress of various challenges via one or more challenge interfaces. For example, for a given challenge, a display, timer, or other interface element may convey challenge-related information including, without limitation, time remaining for challenge, number of gameplay sessions remaining for challenge, number of attempts thus far by challenge recipient, recipient performance statistics or ratings thus far, and the like.

While aspects of the invention may be described herein with reference to various game levels or modes, characters, roles, game items, etc. associated with a "shooter" game, it should be appreciated that any such examples are for illustrative purposes only, and are not intended to be limiting. The system and method described in detail herein may be used in any genre of video game, without limitation. For example, in addition to customizing video game weapons, the features and functionality described herein may be applied to the customization of other video game objects (e.g., race cars, spaceships, forts, etc.) and/or video game characters (or avatars) and their respective attributes.

Additionally, while aspects of the invention may be further described with reference to multiplayer video games, it should be recognized that the features and functionality described herein are equally applicable to a single player video game.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method for creating and sharing customized video game weapon configurations in multiplayer video games via one or more social networks.

Exemplary System Architecture

Figure 1A:
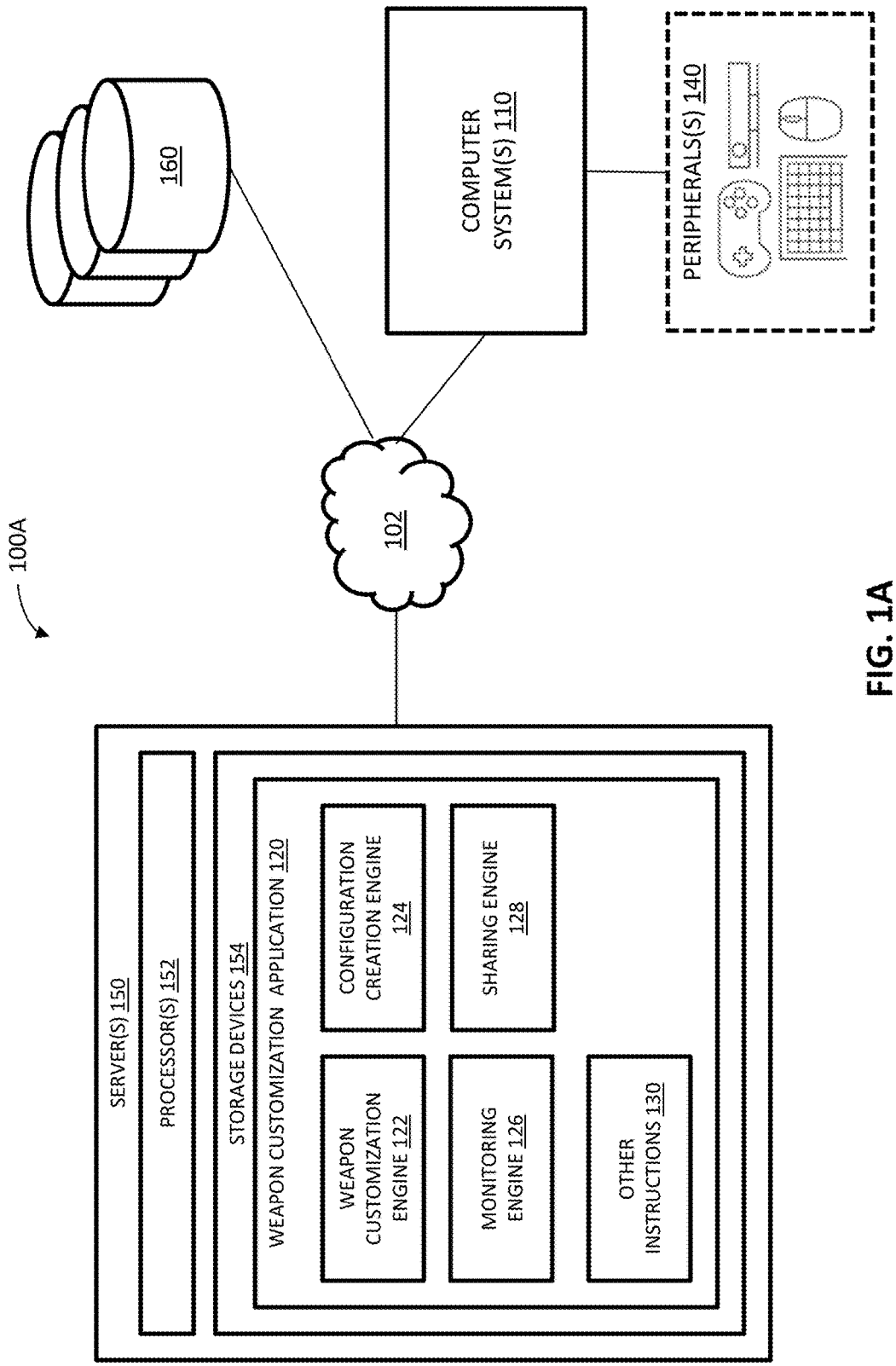
FIG. 1A illustrates an exemplary system for creating and sharing customized video game weapon configurations in multiplayer video games via one or more social networks, according to an implementation of the invention.
Figure 1B:
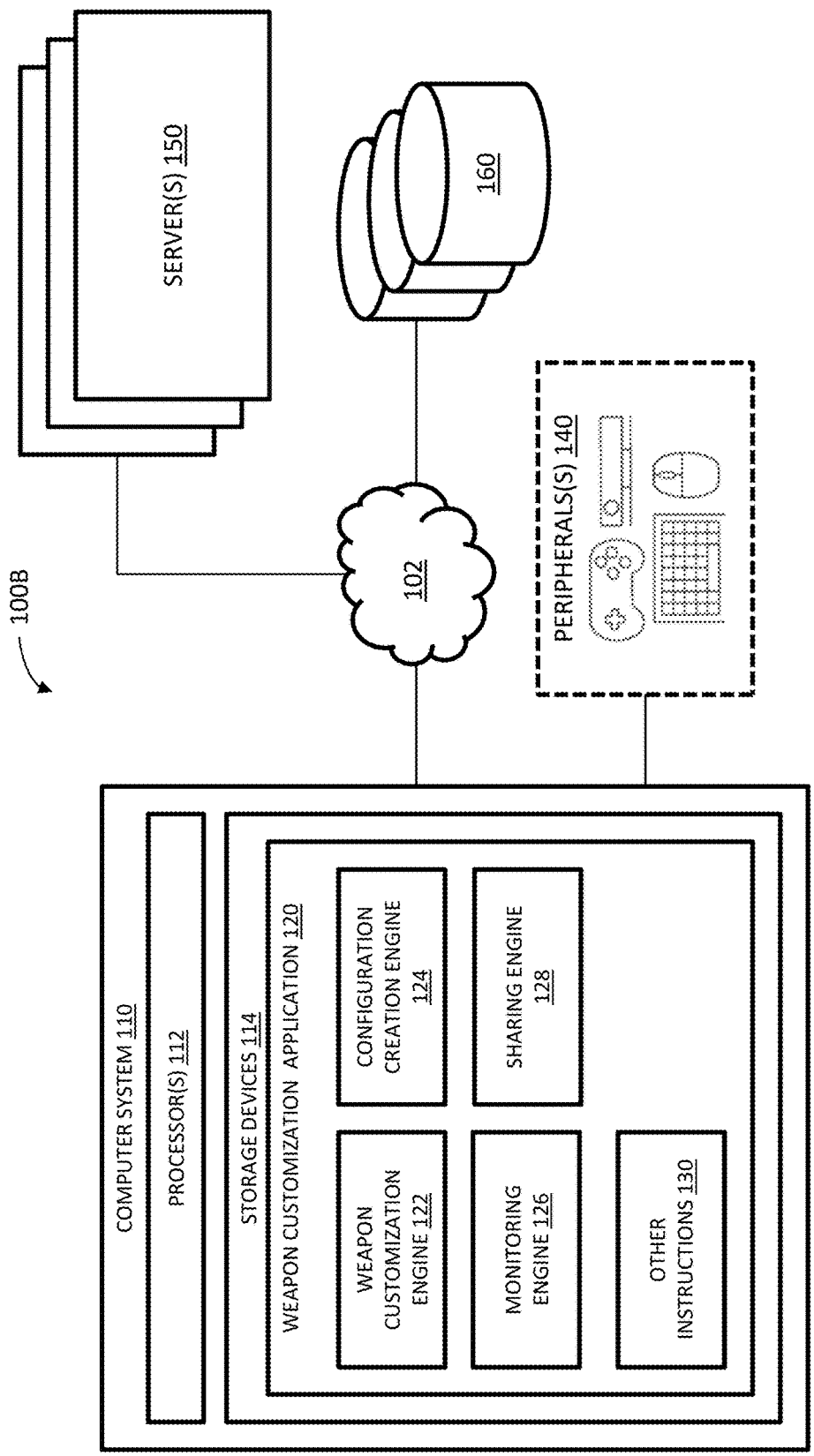
FIG. 1B illustrates an exemplary system for creating and sharing customized video game weapon configurations in multiplayer video games via one or more social networks, according to an implementation of the invention.

FIGS. 1A and 1B each depict an exemplary architecture of a system 100 which may include one or more computer systems 110, one or more servers 150, one or more databases 160, and/or other components.

FIG. 1A illustrates an implementation in which server(s) 150 function as a host computer that hosts gameplay between other devices, such as computer system(s) 110.

FIG. 1B illustrates an implementation in which a given computer system 110 functions as a host computer that hosts gameplay between (or with) other devices, such as other computer system(s) 110. Unless specifically stated otherwise, the description of various system components may refer to either or both of FIGS. 1A and 1B.

Computer System 110

Computer system 110 may be configured as a gaming console, a handheld gaming device, a personal computer (e.g., a desktop computer, a laptop computer, etc.), a smartphone, a tablet computing device, and/or other device that can be used to interact with an instance of a video game.

Referring to FIG. 1B, computer system 110 may include one or more processors 112 (also interchangeably referred to herein as processors 112, processor(s) 112, or processor 112 for convenience), one or more storage devices 114 (which may store a weapon customization application 120), one or more peripherals 140, and/or other components. Processors 112 may be programmed by one or more computer program instructions. For example, processors 112 may be programmed by weapon customization application 120 and/or other instructions (such as gaming instructions used to instantiate the game).

Depending on the system configuration, weapon customization application 120 (or portions thereof) may be part of a game application, which creates a game instance to facilitate gameplay. Alternatively or additionally, weapon customization application 120 may run on a device such as a server 150 to enable players participating in an "online" game hosted by server 150 to customize weapons.

Weapon customization application 120 may include instructions that program computer system 110. The instructions may include, without limitation, a weapon customization engine 122, a configuration creation engine 124, a monitoring engine 126, a sharing engine 128, and/or other instructions 130 that program computer system 110 to perform various operations, each of which are described in greater detail herein. As used herein, for convenience, the various instructions will be described as performing an operation, when, in fact, the various instructions program the processors 112 (and therefore computer system 110) to perform the operation.

Peripherals 140

Peripherals 140 may be used to obtain an input (e.g., direct input, measured input, etc.) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from a player. Peripherals 140 may be coupled to a corresponding computer system 110 via a wired and/or wireless connection.

Server 150

Server 150 may include one or computing devices. Referring to FIG. 1A, server 150 may include one or more physical processors 152 (also interchangeably referred to herein as processors 152, processor(s) 152, or processor 152 for convenience) programmed by computer program instructions, one or more storage devices 154 (which may store a map management application 120), and/or other components. Processors 152 may be programmed by one or more computer program instructions. For example, processors 152 may be programmed by gaming instructions used to instantiate the game.

Depending on the system configuration, weapon customization application 120 (or portions thereof) may be part of a game application, which creates a game instance to facilitate gameplay. Alternatively or additionally, portions or all of weapon customization application 120 may run on computer system 110 or server 150.

Although each is illustrated in FIGS. 1A and 1B as a single component, computer system 110 and server 150 may each include a plurality of individual components (e.g., computer devices) each programmed with at least some of the functions described herein. In this manner, some components of computer system 110 and/or server 150 may perform some functions while other components may perform other functions, as would be appreciated. Thus, either or both server 150 and computer system 100 may function as a host computer programmed by weapon customization application 120. The one or more processors (112, 152) may each include one or more physical processors that are programmed by computer program instructions. The various instructions described herein are exemplary only. Other configurations and numbers of instructions may be used, so long as the processor(s) (112, 152) are programmed to perform the functions described herein.

Furthermore, it should be appreciated that although the various instructions are illustrated in FIGS. 1A and 1B as being co-located within a single processing unit, in implementations in which processor(s) (112, 152) include multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) (112,152) may be programmed by one or more additional instructions that may perform some or all of the functionality attributed herein to one of the instructions.

Storage Devices (114,154)

The various instructions described herein may be stored in one or more storage devices, such as storage devices (114, 154) which may comprise random access memory (RAM), read only memory (ROM), and/or other memory. The storage device may store the computer program instructions (e.g., the aforementioned instructions) to be executed by processor (112, 152) as well as data that may be manipulated by processor (112, 152). The storage device may comprise floppy disks, hard disks, optical disks, tapes, or other storage media for storing computer-executable instructions and/or data.

Network 102

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

Databases 160

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Exemplary Multiplayer System Configurations

Figure 2A:
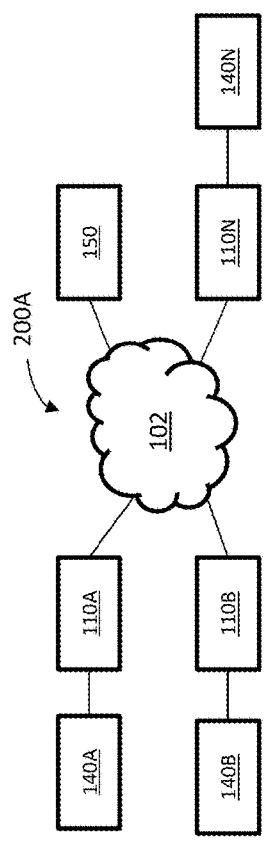
FIG. 2A illustrates an exemplary system configuration in which a server hosts a plurality of computer devices to facilitate a multiplayer video game, according to an implementation of the invention.

FIG. 2A illustrates an exemplary system configuration 200A in which a server hosts a plurality of computer devices to facilitate a multiplayer game, according to an implementation of the invention. In one implementation, one or more servers 150 may host a number of computer systems 110 (illustrated as computer systems 110A, 110B, . . . , 110N) via a network 102. Each computer system 110 may include one or more peripherals (illustrated as peripherals 140A, 140B, . . . , 140N). In this manner, one or more servers 150 may facilitate the gameplay of different players using different computer systems 110 and/or otherwise provide one or more operations of weapon customization application 120.

In some instances, a given server 150 may be associated with a proprietary gameplay network system, such as, without limitation, Microsoft's Xbox LIVE® and Sony's PlayStation Network®, and/or another type of gameplay network system. In this implementation, a given computer system 110 may be associated with a particular type of gaming console. Other types of computer systems 110 using other types of gameplay networks may be used as well.

Figure 2B:
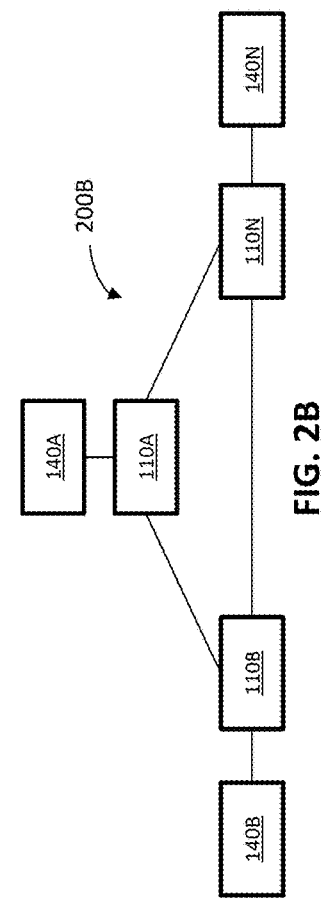
FIG. 2B illustrates an exemplary system configuration in which a plurality of networked servers communicate with one another to facilitate a multiplayer video game, according to an implementation of the invention.

FIG. 2B illustrates an exemplary system configuration 200B in which a plurality of computer systems 110 are networked together to facilitate a multiplayer game, according to an implementation of the invention. Any one or more of the computer devices 110 may serve as a host and/or otherwise provide one or more operations of weapon customization application 120.

Figure 2C:
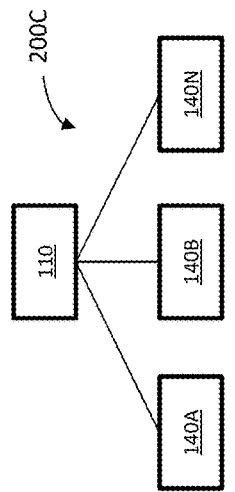
FIG. 2C illustrates an exemplary system configuration in which a plurality of computer devices are networked together to facilitate a multiplayer video game, according to an implementation of the invention.

FIG. 2C illustrates an exemplary system configuration 200C in which a computer system 110 is used by a plurality of players to facilitate a multiplayer game, according to an implementation of the invention. In an implementation, computer system 110 may be considered to host the multiplayer game and/or otherwise provide one or more operations of weapon customization application 120.

Referring to FIGS. 2A-2C, in an implementation, a host may facilitate the multiplayer game and/or perform other operations described herein. In an implementation, at least some of these operations may also or instead be performed by an individual computer system 110. Furthermore, the illustrated system configurations are exemplary only and should not be viewed as limiting in any way. Other system configurations may be used as well, as would be appreciated by those having skill in the art.

Selecting and Customizing Weapons

According to an aspect of the invention, weapon customization engine 122 (of weapon configuration application 120) may enable a player to select and customize a weapon to be used in a gameplay session. In various implementations, a player may select and customize a weapon based on game type, his or her role within the game (e.g., sniper), individual preferences, or other considerations. Weapons may be customized prior to commencement of a gameplay session, or at other times.

Selecting a Weapon Type/Weapon

Weapon customization engine 122 may enable a player to select a weapon to be used in a gameplay session via one or more user interfaces. Weapons may be selected from among one or more weapon types. Non-limiting examples of weapon types may include, without limitation, assault weapons, light machine guns, sniper rifles, shotguns, submachine guns, pistols, or other weapon types.

Each weapon type may comprise one or more associated weapons. For example, the assault weapon type may include, without limitation, assault rifles such as an M16 assault rifle, an AK47 assault rifle, an AUG assault rifle, a Famas assault rifle, and/or other types of assault weapons.

The light machine gun weapon type may include, without limitation, machine guns such as an M60 light machine gun, an HK21 light machine gun, an RPK light machine gun, and/or other types of light machine guns.

The sniper rifle weapon type may include, without limitation, sniper rifles such as an L96A1 sniper rifle, a PSG1 sniper rifle, a Dragunov sniper rifle, and/or other types of sniper rifles.

The shotgun weapon type may include, without limitation, shotguns such as an SPAS-12 shotgun, a Stakeout shotgun, an Olympia shotgun, and/or other types of shotguns.

The submachine gun weapon type may include, without limitation, submachine guns such as an MP5 submachine gun, a Skorpion submachine gun, an MAC11 submachine gun, a UZI submachine gun, and/or other types of submachine guns.

The pistol weapon type may include, without limitations, pistols and handguns such as an M1911 pistol, an ASP pistol, a Beretta pistol, and/or other types of pistols or handguns.

In one implementation, the various weapon types and associated weapons made available for selection may be system-defined (e.g., defined by the game logic), user-defined (e.g., through one or more user interfaces prior to the commencement of a gameplay session), or a combination thereof. In addition, a player's skill level (e.g., beginner, intermediate, advanced), game type, or other factors may be used to determine whether some or all weapon types and associated weapons are made available to the player for selection. As an example, some weapon types may be "unlocked" or otherwise made available for a player after the player has achieved certain score, levels, or other performance benchmarks during gameplay. Information relating to each weapon type and its associated weapons may be stored (e.g., in database 160).

Selecting Weapon Attributes

According to an aspect of the invention, once a weapon has been selected, weapon customization engine 122 may enable a player to customize the selected weapon by selecting one or more weapon attributes via one or more user interfaces. Weapon attributes may comprise weapon performance attributes which may alter the performance of a weapon, weapon appearance attributes which may alter the appearance of a weapon, or other attributes.

Examples of weapon performance attributes may comprise various weapon attachments, components, or accessories including, but not limited to, sights and optics, suppressors, grips, extended magazines, trigger types, bullet types, barrels, launchers, etc. that can impact the performance of a weapon.

Weapon appearance attributes may comprise characteristics concerning the finish of (all or a portion of) a weapon including, but not limited to, paint job, camouflages, or other decorative skins for a weapon. Weapon appearance attributes may also comprise cosmetic variants of weapon attachments, components, or accessories such as, for example, those listed above.

As previously noted, certain customizations of a weapon may be non-visible (e.g., upgraded bullets) or difficult to see (e.g., a customized grip). As such, to visually depict such customizations, one or more visual effects or indicators may be utilized. For example, a portion of a weapon or weapon attachment, component, or accessory may glow in one or more colors to indicate a customization, or be shown as translucent, or shaded, or with a custom skin applied, or with a particle effect, or some other effect applied. Numerous examples are possible. Additionally or alternatively, a graphical indicator (e.g., a floating icon, text box, or other graphic) may be displayed in close proximity to the weapon (e.g., hover above or below the weapon) during gameplay to convey the customization. Other visual depictions may be implemented.

It should be appreciated that customizable attributes may differ based on weapon and/or weapon type (e.g., one or more scopes or sights may be available for a sniper rifle, but not for a pistol or handgun). Moreover, a player's skill level (e.g., beginner, intermediate, advanced), game type, or other factors may be used to determine whether some or all weapon attributes are made available to the player for customization. As an example, some weapon attributes may be "unlocked" or otherwise made available for a player after the player has achieved certain score, levels, or other performance benchmarks during gameplay. For instance, a player may be required to complete a certain action (e.g., killing two people with a single bullet) a predetermined number of times to unlock weapon performance attributes and/or weapon appearance attributes. Other examples may of course be implemented. Information relating to customizable attributes may be stored (e.g., in database 160).

Creating and Storing Weapon Configurations

According to an aspect of the invention, configuration creation engine 124 (of weapon configuration application 120) may create and store a weapon configuration (or weapon profile) based on a weapon and/or weapon attributes selected by a player. In one implementation, a player may be provided an option to create a weapon configuration after selection and/or customization of a weapon. In another implementation, a weapon configuration may be automatically created after a player has selected a weapon and/or weapon attributes. In some implementations, players may create multiple weapon configurations for use during various gameplay sessions.

In one implementation, configuration creation engine 124 may associate a name with a created weapon configuration for easy identification of the weapon configuration. For example, configuration creation engine 124 may assign a name or other identifier to a weapon configuration, or enable a player to enter a name (e.g., "Frank's Pain Inflictor") or other identifier during or after creation of a weapon configuration. A name or identifier may comprise a predetermined number (e.g., sixteen) of letters, numbers, and/or other characters. Other types of data may be associated with a weapon configuration.

Each weapon configuration may be stored (e.g., in database 160) such that it is accessible by a player (or other user) at a later time as described in detail below.

Weapon Performance Statistics

According to an aspect of the invention, each weapon configuration may include a performance profile comprising one or more weapon performance statistics. Examples of weapon performance statistics may include, but are not limited to, damage, accuracy, fire rate, range, handling, mobility, reload time, magazine size, and damage multipliers, among others. Each performance statistic may have an associated number (or other value or rating) that falls within a predetermined range. It should be appreciated that each weapon or weapon type may have different weapon performance statistics than other weapons or weapon types. As a non-limiting example, when compared to a submachine gun, a sniper rifle may have a higher range proficiency (or rating), but a lower fire rate.

Configuration creation engine 124 may store, otherwise access (e.g., from database 160), and/or manage weapon performance statistics for weapons, weapon types, and/or weapon attributes. In one implementation, configuration creation engine 124 may establish a performance profile for a customized weapon configuration. For example, a given weapon may have an initial or template performance profile. One or more of the weapon performance statistics comprising the performance profile may then be adjusted depending on the particular weapon attributes selected by the player. Each weapon attribute may impact one or more of the weapon performance statistics by a predetermined amount in a positive or negative manner, or have a neutral impact on a weapon performance statistic. As a non-limiting example, a weapon equipped with a suppressor attachment may have a reduced damage proficiency (or rating) and range proficiency as compared to the same weapon without the suppressor attachment. In an alternative example, an assault rifle used with a full metal jacket may have an increased damage proficiency, but a reduced accuracy proficiency.

Selecting Weapon Configurations

Prior to or during a gameplay session, a player may select to use a default (e.g., a stock or template) weapon configuration, a weapon configuration previously created by the player, or a weapon configuration from among various weapon configurations that have been created and shared (or otherwise made available) by other players (as described in greater detail below).

In some implementations, a player may also select a weapon configuration when creating a personalized or customized player profile, or a "class" or "loadout" in the Call of Duty® franchise. As previously noted, some first-person shooter games (such as Call of Duty®) enable players to customize the appearance of their avatar (or game character), their weapons, perks or special abilities, and the like. To avoid having to re-create a customized weapon configuration from scratch when creating a new player profile (or class), weapon configuration application 120 may enable a player to select a weapon configuration previously created by the player, or by other players. It should be appreciated that, in some implementations, a created weapon configuration may be provided for selection whenever a player has an any opportunity to select or create a new weapon.

In one implementation, a weapon configuration that is created during creation of a new player profile (or class) may be stored (e.g., in database 160) such that it is accessible by a player (or other user) at a later time.

Monitoring Gameplay Performance

According to an aspect of the invention, monitoring engine 126 may monitor and store a variety of statistics during a gameplay session. Monitored gameplay statistics may include, for example, player performance statistics when using a weapon configuration, weapon usage statistics, or other gameplay statistics.

Examples of player performance statistics for a given weapon configuration may include number of kills, accuracy, kill-to-death ratio, win-loss ratio, kills per minute, score, or other statistics. Each player performance statistic may comprise a numerical value or other metric.

Weapon usage statistics for a given weapon configuration may include number of shots fired, number of games played, time played, weapon progress, and/or other information related to the use or performance of a weapon configuration. Each weapon usage statistic may comprise a numerical value or other metric.

Player performance statistics and/or weapon usage statistics may be uniform across some or all weapon configurations. Alternatively, some weapon configurations may have a unique set of gameplay statistics based on, for example, weapon, weapon type, and/or weapon attributes.

In one implementation, gameplay statistics for a weapon configuration may be monitored and stored based on each use of the weapon configuration by a player. Acquired statistics may be analyzed on a per player basis, or aggregated for two or more players, over any number of gameplay sessions and/or for any given time period (e.g., uses of the weapon configuration in the last hour, day, week, month, year, etc.). In this manner, various subsets of monitored gameplay statistics for a given weapon configuration can be obtained.

Player Performance Rating

According to an aspect of the invention, for a given weapon configuration, one or more player performance statistics (described above) may be added or averaged over a predetermined number of gameplay sessions (or over a predetermined time interval) to generate an overall player performance rating for a player for that weapon configuration.

The overall player performance rating for one or more players for a given weapon configuration may be added or averaged to generate a global player performance rating for that weapon configuration.

Weapon Usage Rating

Similarly, for a given weapon configuration, one or more weapon usage statistics (described above) may be added or averaged over a predetermined number of gameplay sessions (or over a predetermined time interval) to generate an overall weapon usage rating for a player for that weapon configuration.

The overall weapon usage rating for one or more players for a given weapon configuration may be added or averaged to generate a global weapon usage rating for that weapon configuration.

Weapon Performance Rating

In one implementation, a global player performance rating for a given weapon configuration and a global weapon usage rating for the same weapon configuration may be added or averaged to generate a single weapon performance rating for the weapon configuration.

In some implementations, players may, via one or more user interfaces, browse or filter various weapon configurations available for selection and use by one or more of individual player performance rating, global player performance rating, individual weapon usage rating, global weapon usage rating, or single weapon performance rating.

Sharing Weapon Configurations & Gameplay Statistics

According to an aspect of the invention, sharing engine 128 (of weapon customization application 120) may enable a player to share weapon configurations, information about weapon configurations, and/or gameplay statistics associated with use of weapon configurations, both internally (e.g., in-game) and externally (e.g., via one or more external social networks).

For example, for a given weapon configuration, a player may specify, via one or more interfaces, that he or she wishes to share one or more of weapon type, weapon, weapon performance attributes (e.g., weapon attachments, components, or accessories), weapon appearance attributes (e.g., paint job, camouflages, decorative skins, or other finishes), weapon performance statistics (e.g., damage, accuracy, fire rate, range, handling, mobility, reload time, magazine size, damage multipliers, etc.), player performance statistics (e.g., number of kills, accuracy, kill-to-death ratio, win-loss ratio, kills per minute, score, or other statistics), weapon usage statistics (e.g., number of shots fired, number of games played, time played, weapon progress, and/or other information related to the use or performance of the weapon configuration), individual player performance rating, global player performance rating, individual weapon usage rating, global weapon usage rating, single weapon performance rating, or other information relating the weapon configuration. A player may further specify that he or she wishes to make a customized weapon configuration available for gameplay by one or more other players.

In some implementations, a user may specify that a customized weapon configuration and/or some or all of the foregoing information be made available to all players, or a subset of players including, but not limited to, friends (or followers), or team members, or other groups of players.

Sharing engine 128 may enable a player to share weapon configurations, information about weapon configurations, and/or gameplay statistics internally (in-game) via, for example, an in-game social network or a game publisher-centric social network accessible by game players.

Additionally or alternatively, sharing engine 128 may enable a player to share weapon configurations, information about weapon configurations, and/or gameplay statistics via one or more external social networks (e.g., Facebook, Google+, Twitter, Instagram, Vine, Tumblr, etc.).

In one implementation of the invention, sharing engine 128 may enable a player to transmit communications (e.g., email messages, text messages, or other electronic communications) that include hyperlinks or other selectable graphical user interface objects that enable recipients to access the shared information.

In yet another implementation of the invention, sharing engine 128 may further enable a player to include personalized text, graphics, pictures, audio, video, or other multimedia when sharing weapon configurations, information about weapon configurations, and/or gameplay statistics. As a non-limiting example, sharing engine 128 may enable a player to provide a video clip highlighting gameplay using the particular weapon configuration.

Challenges

According to an aspect of the invention, sharing engine 128 may enable a player to issue challenges to one or more other players to obtain or exceed certain player performance statistics (e.g., number of kills, accuracy, kill-to-death ratio, win-loss ratio, kills per minute, score, or other statistics), weapon usage statistics, or ratings, and/or achieve other objectives using a given weapon configuration. Challenges may have predetermined durations such that a challenge issuer may require a challenge recipient to attempt or complete a challenge within a predetermined number of gameplay sessions, or within a predetermined time interval.

In one implementation, players may follow the progress of various challenges via one or more challenge interfaces. For example, for a given challenge, a display, timer, or other interface element may convey challenge-related information including, without limitation, time remaining for challenge, number of gameplay sessions remaining for challenge, number of attempts thus far by challenge recipient, recipient performance statistics or ratings thus far, and the like.

Exemplary Interfaces

According to an aspect of the invention, weapon customization application 120 may generate various interfaces that enable players to, among other things, create customized weapon configurations, share weapon configurations, share information about weapon configurations, share gameplay statistics, issue challenges to other players, and/or monitor challenge-related information. FIGS. 3A-3E each depict an example of a user interface that a player may access in one or more implementations of the invention. The layout of each interface is exemplary in nature, and should not be viewed as limiting. The content of each interface may vary in different implementations along with, for instance, the various navigational tools that enable users to select, access, display, or navigate through the features and functionality of the interface, including selection objects (or buttons), drop-down menus, and the like.

Figure 3A:
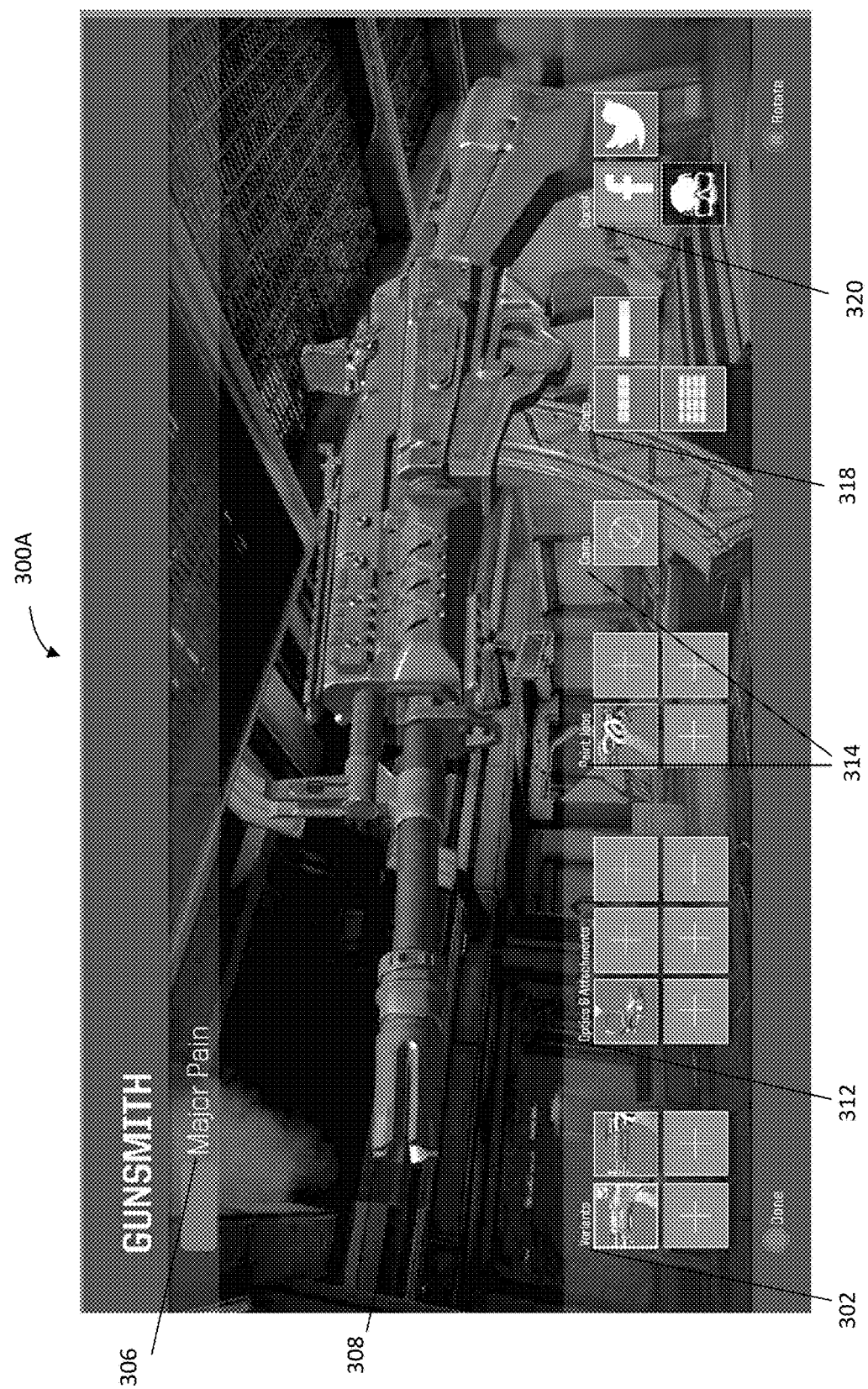
FIGS. 3A-3E each depict an exemplary weapon configuration interface, according to an implementation of the invention.

FIG. 3A depicts an example of a weapon configuration interface 300A for displaying a player's weapon configuration(s), according to an aspect of the invention. As shown, interface 300A depicts a weapon configuration graphical selection menu 302 of icons or other graphical selection objects that display (or enable a player to access) one or more weapon configurations (or variants). Weapon display 308 displays a graphical representation of a selected weapon configuration, along with a weapon configuration name 306 (e.g., "Major Pain").

A weapon performance attribute graphical selection menu 312 of icons or other graphical selection objects may display (or enable a player to access) one or more equipped attachments, components, or accessories for the selected weapon configuration.

A weapon appearance attribute graphical selection menu 314 of icons or other graphical selection objects may display (or enable a player to access) one or more characteristics concerning the finish of (all or a portion of) the selected weapon including, but not limited to, paint job, camouflages, or other decorative skins for a weapon.

Interface 300A may further comprise a gameplay statistics graphical selection menu 318 of icons or other graphical selection objects that displays (or enables a player to access) gameplay statistics for the selected weapon configuration including, but not limited to, player performance statistics (e.g., number of kills, accuracy, kill-to-death ratio, win-loss ratio, kills per minute, score, or other statistics), weapon usage statistics (e.g., number of shots fired, number of games played, time played, weapon progress, and/or other information related to the use or performance of the weapon configuration), individual player performance rating, global player performance rating, individual weapon usage rating, global weapon usage rating, single weapon performance rating, or other information relating the weapon configuration.

A sharing graphical selection menu 320 of icons or other graphical selection objects may enable a player to share the selected weapon configuration, information about the selected weapon configuration, and/or gameplay statistics associated with use of the selected weapon configuration internally (e.g., in-game) and/or externally (e.g., via one or more external social networks), as well as issue challenges to one or more other players that involve the selected weapon configuration.

Figure 3B:
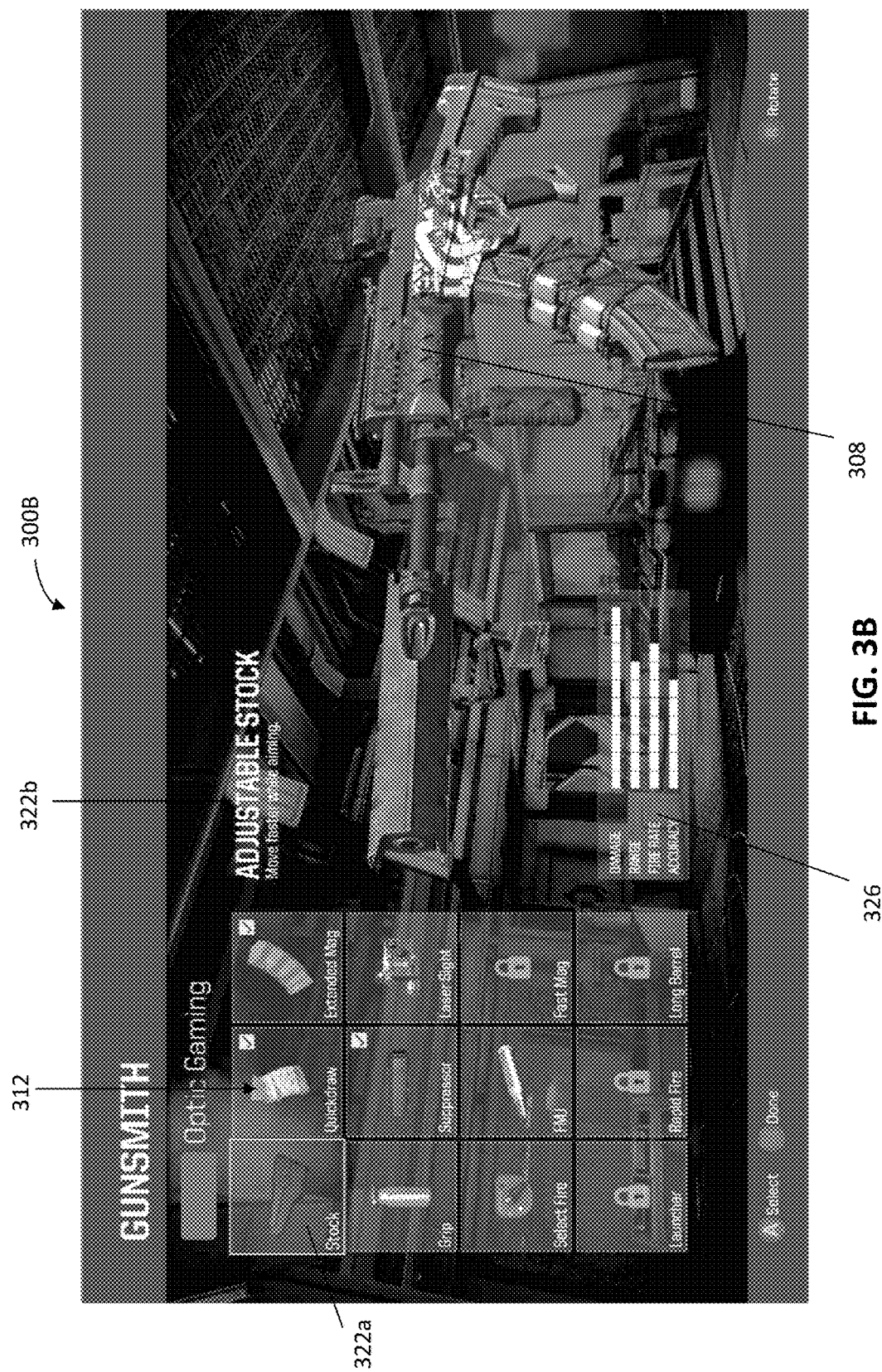

FIG. 3B depicts an example of a weapon configuration interface 300B for displaying weapon performance attributes associated with a selected weapon configuration, according to an aspect of the invention. As shown, graphical selection menu 312 of icons or other graphical selection objects may display (or enable a player to access) one or more equipped attachments, components, or accessories for the selected weapon configuration. In this example, selected weapon performance attributes include "Quickdraw," "Extended Mag," and "Supressor." Further, selection (or highlighting) of a particular weapon performance attribute (e.g., "stock" 322a) may result in a display of a description 322b of the attribute and its capabilities, benefits, or other information. Interface 300B may further comprise a weapon performance statistic display 326 that depicts one or more weapon performance statistics (e.g., damage, accuracy, fire rate, range, handling, mobility, reload time, magazine size, damage multipliers, etc.) for the selected weapon configuration.

Figure 3C:
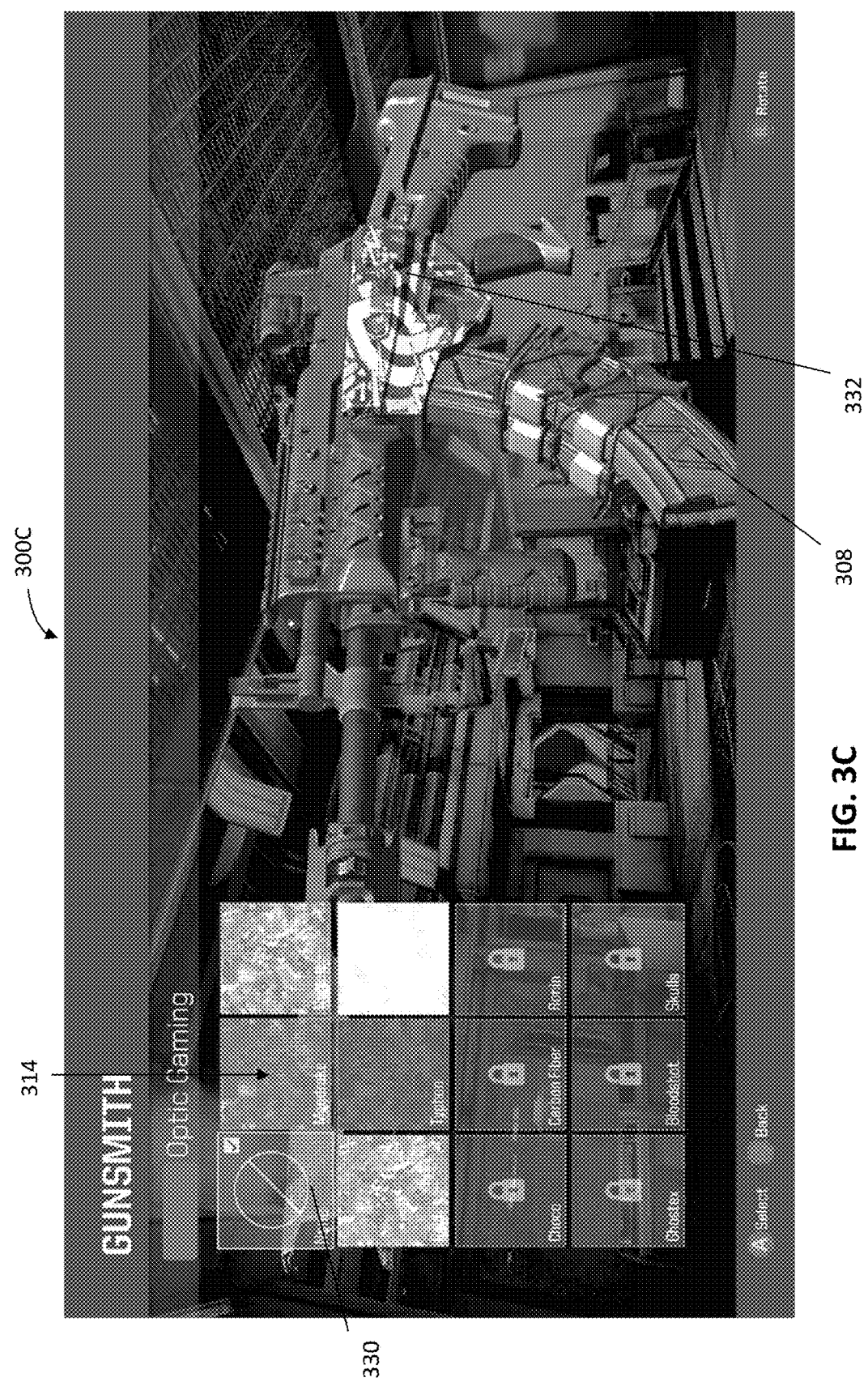

FIG. 3C depicts an example of a weapon configuration interface 300C for displaying weapon appearance attributes associated with a selected weapon configuration, according to an aspect of the invention. As shown, graphical selection menu 314 of icons or other graphical selection objects may display (or enable a player to access) one or more weapon appearance attributes (e.g., paint job, camouflages, other decorative skins, etc.) for the selected weapon configuration. In this example, menu 314 depicts various forms of camouflage (some of which are available for selection, and some of which are "locked" or unavailable for selection). As illustrated, a "none" icon 330 has been selected indicating that no camouflage is to be applied to the weapon. A depiction 332 of a selected paint job for the weapon configuration is also displayed in weapon display 308.

Figure 3D:
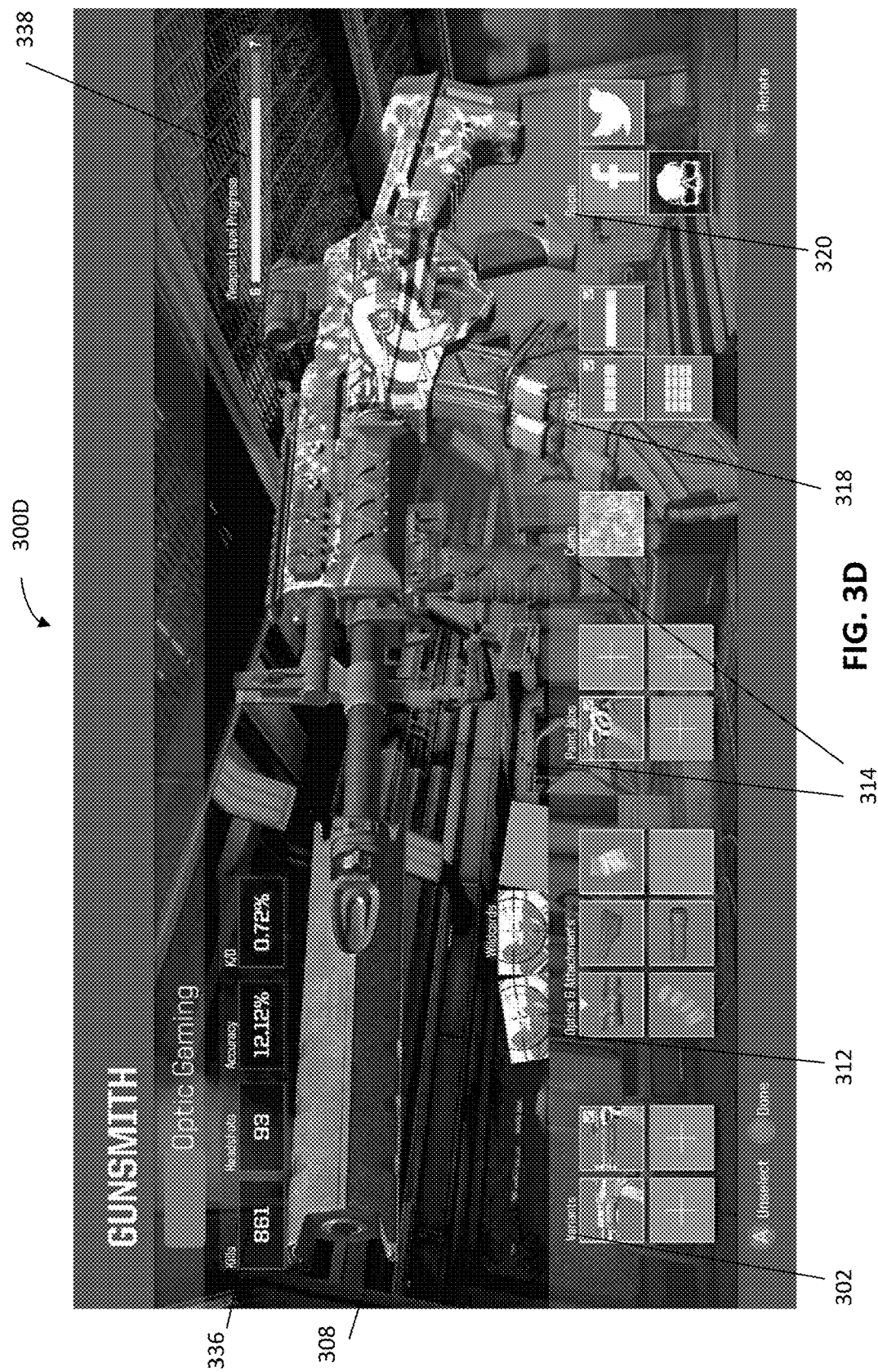

FIG. 3D depicts an example of a weapon configuration interface 300D for displaying gameplay statistics associated with a selected weapon configuration, according to an aspect of the invention. As shown, a player performance statistic display 336 displays various player performance statistics that a player has achieved using the selected weapon configuration, including kills, headshots, accuracy, and kill-todeath ratio. Other statistics may of course be displayed. A weapon level performance display 338 is also depicted in interface 300D.

Figure 3E:
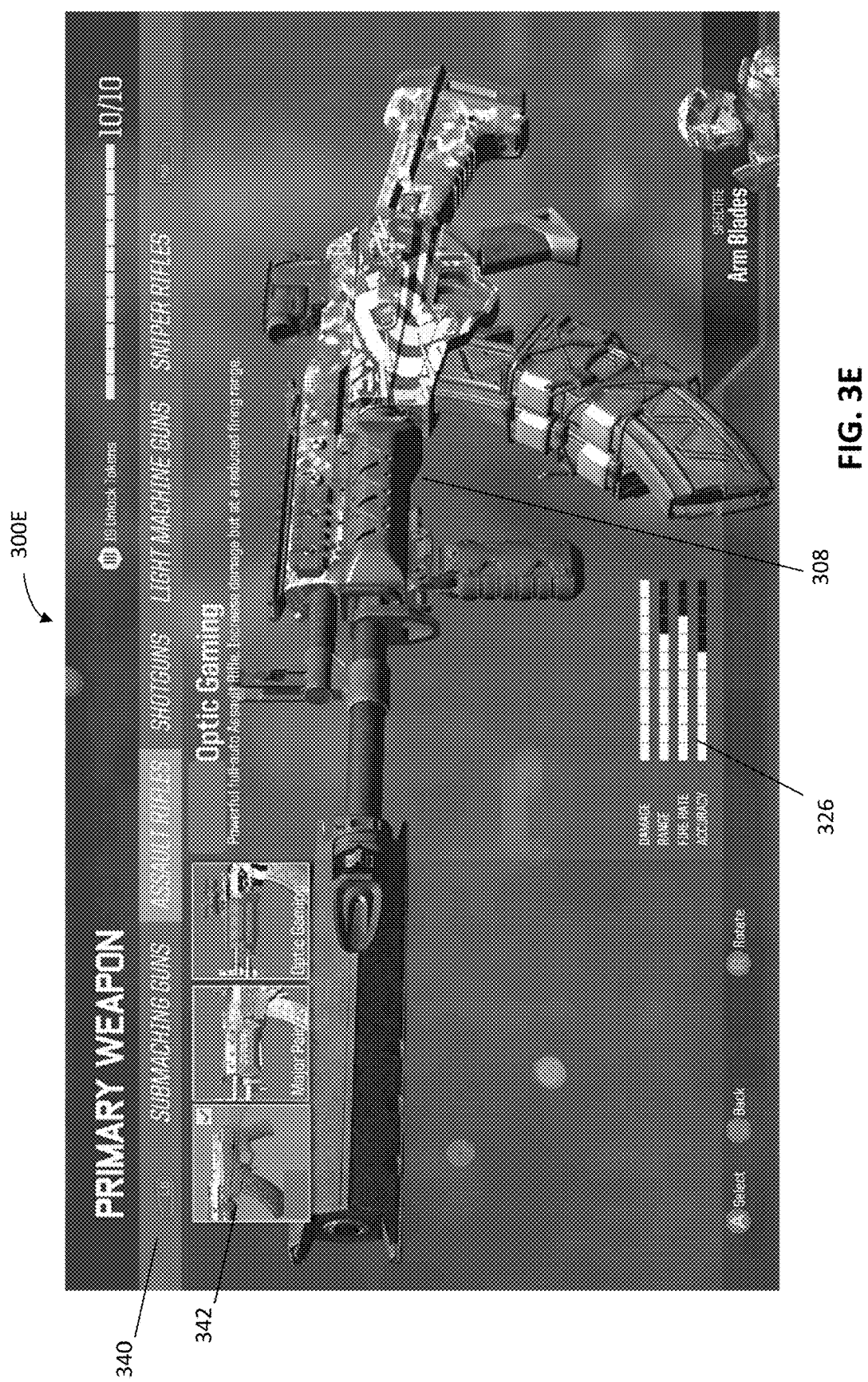

FIG. 3E depicts an example of a weapon configuration interface 300E, according to an aspect of the invention. As shown, a weapon type display panel 340 may depict various weapon types and their associated weapon configurations.

For example, the "Assault Rifles" weapon type is shown as being highlighted (or otherwise selected) in display panel 340, and the associated weapon configurations 342 (e.g., including "Major Pain" and "Optic Gaming") are identified as example weapon configurations available for selection for the "Assault Rifle" weapon type.

Interface 300E may further comprise weapon performance statistic display 326 that depicts one or more weapon performance statistics (e.g., damage, accuracy, fire rate, range, handling, mobility, reload time, magazine size, damage multipliers, etc.) for the selected weapon configuration 342.

Exemplary Flowchart

Figure 4:
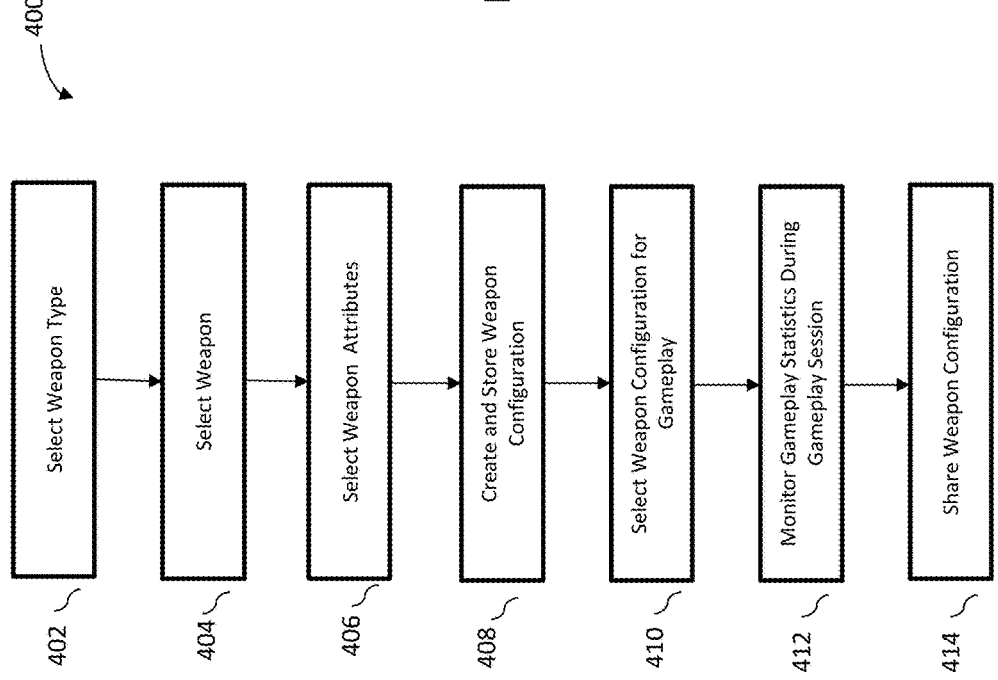
FIG. 4 depicts an exemplary flowchart of processing operations for creating and sharing customized video game weapon configurations in multiplayer video games via one or more social networks, according to an implementation of the invention.

FIG. 4 depicts an exemplary flowchart of processing operations for creating and sharing customized video game weapon configurations in multiplayer video games via one or more social networks, according to an implementation of the invention. The various processing operations and/or data flows depicted in FIG. 4 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagram. One or more operations may be performed simultaneously. Accordingly, the operations as illustrated (and described in greater detail below) are exemplary by nature and, as such, should not be viewed as limiting.

In an operation 402, a player may select a type of weapon to be used in a gameplay session via one or more user interfaces. Non-limiting examples of weapon types may include, without limitation, assault weapons, light machine guns, sniper rifles, shotguns, submachine guns, pistols, or other weapon types.

In an operation 404, a player may select a weapon from among a chosen weapon type. Each weapon type, for example, may comprise one or more associated weapons.

In an operation 406, a player may customize a selected weapon by selecting one or more weapon attributes via one or more user interfaces. Weapon attributes may comprise weapon performance attributes, weapon appearance attributes, or other attributes.

Weapon performance attributes may comprise various weapon attachments, components, or accessories including, but not limited to, sights and optics, suppressors, grips, bullet types, barrels, launchers, etc. that can impact the performance of a weapon.

Weapon appearance attributes may comprise characteristics concerning the finish of (all or a portion of) a weapon including, but not limited to, paint job, camouflages, or other decorative skins for a weapon.

In an operation 408, a weapon configuration (or weapon profile) may be created and stored based on a weapon and/or weapon attributes selected by the player. In one implementation, a player may be provided an option to create a weapon configuration after selection and/or customization of a weapon. In another implementation, a weapon configuration may be automatically created after a player has selected a weapon and/or weapon attributes. In some implementations, players may create multiple weapon configurations for use during various gameplay sessions. A name or other identifier may be assigned to or associated with a weapon configuration during or after creation of a weapon configuration. Other types of data may be associated with a weapon configuration.

In an operation 410, prior to or during a gameplay session, a player may select to use a default (e.g., a stock or template) weapon configuration, a weapon configuration previously created by the player, or a weapon configuration from among various weapon configurations that have been created and shared (or otherwise made available) by other players.

In some implementations, a player may also select a weapon configuration when creating a personalized or customized player profile.

In an operation 412, a variety of gameplay statistics may be monitored and stored during a gameplay session. Monitored gameplay statistics may include, for example, player performance statistics when using a weapon configuration, weapon usage statistics, or other gameplay statistics.

Player performance statistics for a given weapon configuration may include number of kills, accuracy, kill-to-death ratio, win-loss ratio, kills per minute, score, or other statistics. Each player performance statistic may comprise a numerical value or other metric.

Weapon usage statistics for a given weapon configuration may include number of shots fired, number of games played, time played, weapon progress, and/or other information related to the use or performance of a weapon configuration. Each weapon usage statistic may comprise a numerical value or other metric.

Player performance statistics and/or weapon usage statistics may be uniform across some or all weapon configurations. Alternatively, some weapon configurations may have a unique set of gameplay statistics based on, for example, weapon, weapon type, and/or weapon attributes.

Gameplay statistics for a weapon configuration may be monitored and stored based on each use of the weapon configuration by a player. Acquired statistics may be analyzed on a per player basis, or aggregated for two or more players, over any number of gameplay sessions and/or for any given time period (e.g., uses of the weapon configuration in the last hour, day, week, month, year, etc.). In this manner, various subsets of monitored gameplay statistics for a given weapon configuration can be obtained.

For a given weapon configuration, one or more of the player performance statistics described above may be added or averaged over a predetermined number of gameplay sessions (or over a predetermined time interval) to generate an overall player performance rating for a player for that weapon configuration. The overall player performance rating for one or more players for a given weapon configuration may be added or averaged to generate a global player performance rating for that weapon configuration.

Similarly, for a given weapon configuration, one or more weapon usage statistics (described above) may be added or averaged over a predetermined number of gameplay sessions (or over a predetermined time interval) to generate an overall weapon usage rating for a player for that weapon configuration. The overall weapon usage rating for one or more players for a given weapon configuration may be added or averaged to generate a global weapon usage rating for that weapon configuration.

A global player performance rating for a given weapon configuration and a global weapon usage rating for the same weapon configuration may be added or averaged to generate a single weapon performance rating for the weapon configuration. In this regard, in some implementations, players may browse or filter various weapon configurations available for selection and use by one or more of individual player performance rating, global player performance rating, individual weapon usage rating, global weapon usage rating, or single weapon performance rating.

In an operation 414, a player may elect to share weapon configurations, information about weapon configurations, and/or gameplay statistics associated with use of weapon configurations, both internally (e.g., in-game) and externally (e.g., via one or more external social networks).

For example, for a given weapon configuration, a player may specify, via one or more interfaces, that he or she wishes to share one or more of weapon type, weapon, weapon performance attributes (e.g., weapon attachments, components, or accessories), weapon appearance attributes (e.g., paint job, camouflages, decorative skins, or other finishes), weapon performance statistics (e.g., damage, accuracy, fire rate, range, handling, mobility, reload time, magazine size, damage multipliers, etc.), player performance statistics (e.g., number of kills, accuracy, kill-to-death ratio, win-loss ratio, kills per minute, score, or other statistics), weapon usage statistics (e.g., number of shots fired, number of games played, time played, weapon progress, and/or other information related to the use or performance of the weapon configuration), individual player performance rating, global player performance rating, individual weapon usage rating, global weapon usage rating, single weapon performance rating, or other information relating the weapon configuration. A player may further specify that he or she wishes to make a customized weapon configuration available for gameplay by one or more other players.

In some implementations, a user may specify that a customized weapon configuration and/or some or all of the foregoing information be made available to all players, or a subset of players including, but not limited to, friends (or followers), or team members, or other groups of players.

Weapon configurations, information about weapon configurations, and/or gameplay statistics may be shared internally (in-game) via, for example, an in-game social network or a game publisher-centric social network accessible by game players. Additionally or alternatively, weapon configurations, information about weapon configurations, and/or gameplay statistics may be shared via one or more external social networks (e.g., Facebook, Google+, Twitter, Instagram, Vine, Tumblr, etc.).

In some implementations, communications (e.g., email messages, text messages, or other electronic communications) may be transmitted from a player to one or more recipients that include hyperlinks or other selectable graphical user interface objects that enable the recipients to access the shared information.

In yet another implementation of the invention, a player may include personalized text, graphics, pictures, audio, video, or other multimedia when sharing weapon configurations, information about weapon configurations, and/or gameplay statistics.

According to an aspect of the invention, a player may further issue challenges to one or more other players to obtain or exceed certain player performance statistics (e.g., number of kills, accuracy, kill-to-death ratio, win-loss ratio, kills per minute, score, or other statistics), weapon usage statistics, or ratings, and/or achieve other objectives using a given weapon configuration. Challenges may have predetermined durations such that a challenge issuer may require a challenge recipient to attempt or complete a challenge within a predetermined number of gameplay sessions, or within a predetermined time interval.

In one implementation, players may follow the progress of various challenges via one or more challenge interfaces. For example, for a given challenge, a display, timer, or other interface element may convey challenge-related information including, without limitation, time remaining for challenge, number of gameplay sessions remaining for challenge, number of attempts thus far by challenge recipient, recipient performance statistics or ratings thus far, and the like.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of creating and sharing a customized video game weapon configuration in a gameplay session of a multiplayer video game via at least one social network, the method being implemented in a host computer system configured to host the gameplay session of the multiplayer video game between a first player using a first computer system and one or more other players using one or more other computer systems, said host computer system having one or more physical processors programmed with computer program instructions for a weapons customization application comprising at least a weapon customization engine and a sharing engine that, when executed by the one or more physical processors, cause the host computer system to perform the method, the method comprising:

receiving, at the weapons application configured to execute on the host computer system, from the first player, a selection of a video game weapon to be used in the gameplay session of the multiplayer video game;

using the weapon customization engine configured to execute on the host computer system, generating one or more user interfaces configured to present one or more weapon attributes to the first player;

receiving, at the weapon customization engine, from the first player, a selection of the one or more weapon attributes for customizing the video game weapon;

generating, by the weapon customization engine, a customized weapon configuration for the video game weapon based on the selected weapon and the selected one or more weapon attributes;

receiving, at the sharing engine configured to execute on the host computer system, from the first player, a command to share the customized weapon configuration with the one or more other players of the multiplayer video game via at least one social network; and causing the customized weapon configuration to be shared, via the host computer system, with the one or more other players of the multiplayer video game via the at least one social network such that the one or more other players can utilize the customized weapon configuration during a gameplay session, wherein the at least one social network is a game-specific social network associated with the multiplayer video game or a publisher-specific social network associated with the publisher of the multiplayer video game, and wherein the customized video game weapon configuration is sharable by the first player with one or more players within the gameplay session of the video game or with one or more players external to the video game via a social network.

2. The method of claim 1, wherein receiving the selection of the video game weapon further comprises:
   causing, by the weapons customization application, a display of a plurality of video game weapons associated with a particular weapon type; and
   receiving, at weapons customization application, the selection of the video game weapon from among the plurality of displayed video game weapons.

3. The method of claim 1, wherein the one or more weapon attributes comprise weapon performance attributes.

4. The method of claim 3, wherein the weapon performance attributes comprise one or more weapon accessories for the video game weapon.

5. The method of claim 1, wherein the one or more weapon attributes comprise weapon appearance attributes.

6. The method of claim 5, wherein the weapon appearance attributes comprise one or more of a paint job, camouflage, or decorative skin for the video game weapon.

7. The method of claim 1, wherein the at least one social network comprises a third-party social network.

8. The method of claim 1, further comprising:
   monitoring by a monitoring engine of the weapons customization application, gameplay statistics associated with use of the customized weapon configuration during the gameplay session of the video game.

9. The method of claim 8, wherein the gameplay statistics comprise player performance statistics.

10. The method of claim 8, wherein the gameplay statistics comprise weapon usage statistics.

11. A system for creating and sharing a customized video game weapon configuration in a gameplay session of a multiplayer video game via at least one social network, the system comprising:
   a host computer system configured to facilitate the gameplay session of the multiplayer video game between a first player using a first computer system and one or more other players using associated one or more other computer systems, said host computer system comprising one or more physical processors programmed with one or more computer program instructions for a weapons customization application comprising at least a weapon customization engine and a sharing engine, which, when executed, programs the host computer system to:
     receive, from the first player, at the weapons customization application configured to execute on the host computer, a selection of a video game weapon to be used in the gameplay session of the multiplayer video game;
     use the weapon customization engine configured to execute on the host computer system, to generate one or more user interfaces configured to present one or more weapon attributes to the first player;
     receive, at the weapon customization engine, from the first player, a selection of one or more weapon attributes for customizing the video game weapon;
     generate, by the weapon customization engine, a customized weapon configuration for the video game weapon based on the selected weapon and the selected one or more weapon attributes;
     receive, from the first player, at the sharing engine configured to execute on the host computer system, a command to share the customized weapon configuration with the one or more other players of the multiplayer video game via at least one social network; and
     cause the customized weapon configuration to be shared, via the host computer system, with the one or more other players of the multiplayer video game via the at least one social network such that the one or more other players can utilize the customized weapon configuration during a gameplay session, wherein the at least one social network is a game-specific social network associated with the multiplayer video game or publisher-specific social network associated with the publisher of the multiplayer video game, and wherein the customized video game weapon configuration is sharable by the first player with the one or more players within the gameplay session of the video game or with one or more players external to the video game via a social network.

12. The system of claim 11, wherein the host computer system is further programmed to:
   cause a display of a plurality of video game weapons associated with a particular weapon type; and
   receive the selection of the video game weapon from among the plurality of displayed video game weapons.

13. The system of claim 11, wherein the one or more weapon attributes comprise weapon performance attributes.

14. The system of claim 13, wherein the weapon performance attributes comprise one or more weapon accessories for the video game weapon.

15. The system of claim 11, wherein the one or more weapon attributes comprise weapon appearance attributes.

16. The system of claim 15, wherein the weapon appearance attributes comprise one or more of a paint job, camouflage, or decorative skin for the video game weapon.

17. The system of claim 11, wherein the at least one social network comprises a third-party social network.

18. The system of claim 11, wherein the host computer system is further programmed to:
   monitor gameplay statistics associated with use of the customized weapon configuration during a gameplay session.

19. The system of claim 18, wherein the gameplay statistics comprise player performance statistics, wherein the one or more weapon attributes presented to the first player are based on at least a type of the weapon and the player performance statistics.

20. The system of claim 18, wherein the gameplay statistics comprise weapon usage statistics.

21. A computer program product for creating and sharing a customized video game weapon configuration in a gameplay session of a multiplayer video game via at least one social network, the computer program product comprising:
   one or more tangible, non-transitory computer-readable storage devices associated with a host computer configured to facilitate the gameplay session of the multiplayer video game between a first player using a first computer system and one or more other players using associated one or more other computer systems;
   program instructions, stored on at least one of the one or more tangible, non-transitory computer-readable tangible storage devices for a weapons customization application comprising at least a weapon customization engine and a sharing engine, that, when executed, programs the host computer to:
     receive, from the first player, at the weapons customization application configured to execute on the host computer, a selection of a video game weapon to be used in the gameplay session of the multiplayer video game;

use the weapon customization engine configured to execute on the host computer system, to generate one or more user interfaces configured to present one or more weapon attributes to the first player;

receive, at the weapon customization engine, from the first player, a selection of one or more weapon attributes for customizing the video game weapon;

generate, by the weapon customization engine, a customized weapon configuration for the video game weapon based on the selected weapon and the selected one or more weapon attributes;

receive, from the first player, at the sharing engine configured to execute on the host computer system, a command to share the customized weapon configuration with the one or more other players of the multiplayer video game via at least one social network; and cause the customized weapon configuration to be shared, via the host computer system, with the one or more other players of the multiplayer video game via the at least one social network such that the one or more other players can utilize the customized weapon configuration during a gameplay session, wherein the at least one social network is an in-game social network or a social network centered around a publisher of the multiplayer video, and wherein the customized video game weapon configuration is sharable by the first player with the one or more players within the gameplay session of the video game, or with one or more players external to the video game via a social network.

\* \* \* \* \*